(12) United States Patent
Hessel et al.

(10) Patent No.: US 6,508,033 B2
(45) Date of Patent: Jan. 21, 2003

(54) SELF CONTAINED FULLY AUTOMATED ROBOTIC CROP PRODUCTION FACILITY

(75) Inventors: Lior Hessel, Kiryat Bialik (IL); David Bar-On, Givat Ella (IL)

(73) Assignee: Organitech Ltd., Nesher (IL)

( * ) Notice: Subject to any disclaimer, the term of this patent is extended or adjusted under 35 U.S.C. 154(b) by 0 days.

(21) Appl. No.: 10/083,343

(22) Filed: Feb. 27, 2002

(65) Prior Publication Data

US 2002/0088173 A1 Jul. 11, 2002

Related U.S. Application Data

(63) Continuation-in-part of application No. PCT/US00/23877, filed on Aug. 31, 2000.

(51) Int. Cl.[7] ............................................... A01G 31/00
(52) U.S. Cl. ......................................................... 47/60
(58) Field of Search ........................ 47/58.1, 60, 1.01 P

(56) References Cited

U.S. PATENT DOCUMENTS

| | | | | |
|---|---|---|---|---|
| 3,579,907 A | * | 5/1971 | Graves | 47/17 |
| 4,228,636 A | | 10/1980 | Homburg | 250/330 |
| 4,879,840 A | * | 11/1989 | den Daas | 47/65 |
| 5,130,545 A | | 7/1992 | Lussier | 702/81 |
| 5,150,175 A | | 9/1992 | Whitman et al. | 356/429 |
| 5,247,761 A | * | 9/1993 | Miles et al. | 47/1.01 R |
| 5,252,108 A | * | 10/1993 | Banks | 47/58.1 R |
| 5,309,374 A | | 5/1994 | Misra et al. | 250/458.1 |
| 5,424,543 A | | 6/1995 | Dombrowski | 56/10.2 R |
| 5,638,636 A | * | 6/1997 | Hiyama et al. | 47/44 |
| 6,053,220 A | * | 4/2000 | Lo et al. | 141/129 |

* cited by examiner

Primary Examiner—Charles T. Jordan
Assistant Examiner—Judith A. Nelson
(74) Attorney, Agent, or Firm—Mark M. Friedman

(57) ABSTRACT

An automated system for providing a continuous yield of fresh agricultural produce. The system includes a housing including at least one zone for plant growth and at least one zone for holding automated robotic equipment. Robotic equipment includes a robotic device including at least one robotic arm for seeding seeds being stored in a seed reservoir in the seeding locations, for planting seedlings in the planting locations and for harvesting mature plants from the planting locations. Further disclosed are devices and methods for increasing efficiency of plant transfer and minimizing root damage during transfer. Further disclosed are devices and methods for increasing efficiency of plant growing, by providing oxygen dissolved in irrigation water to the plant roots.

109 Claims, 10 Drawing Sheets

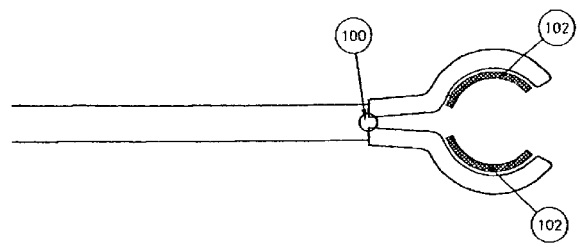
Fig.6
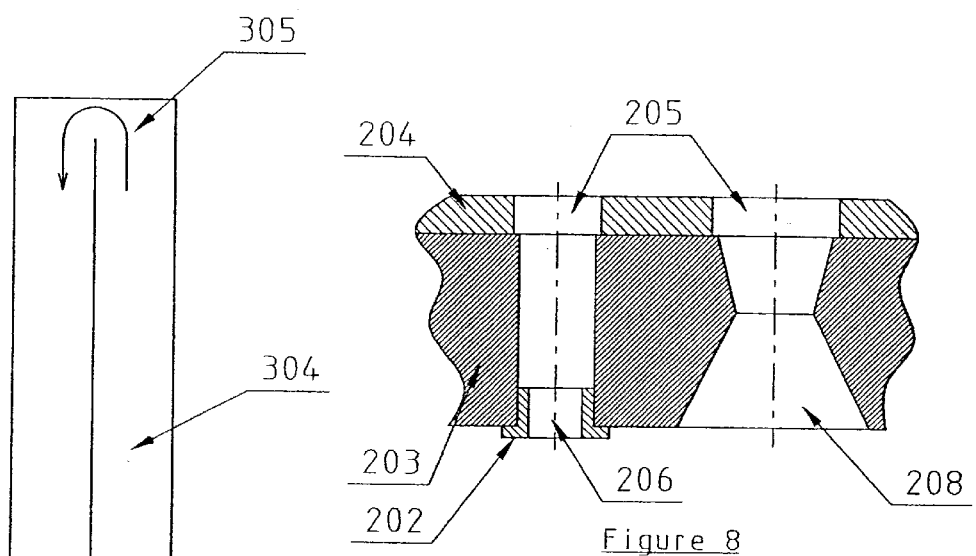
Figure 8
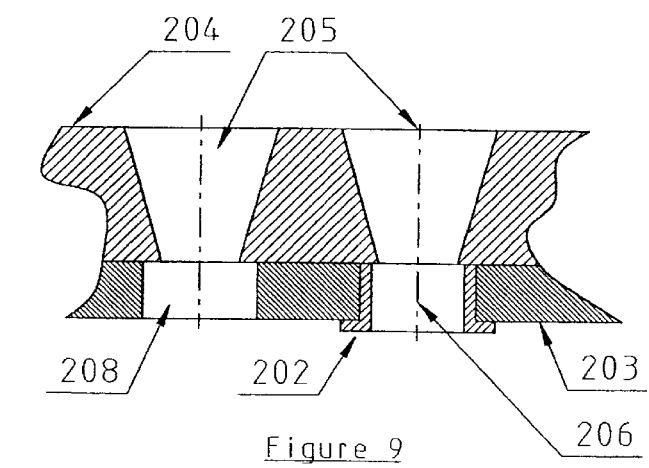
Figure 9
Figure 7

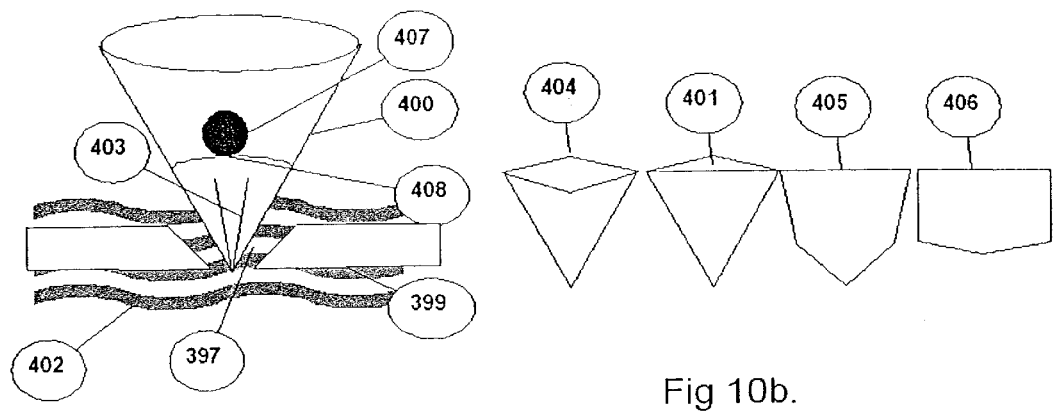
Fig 10a.
Fig 10b.
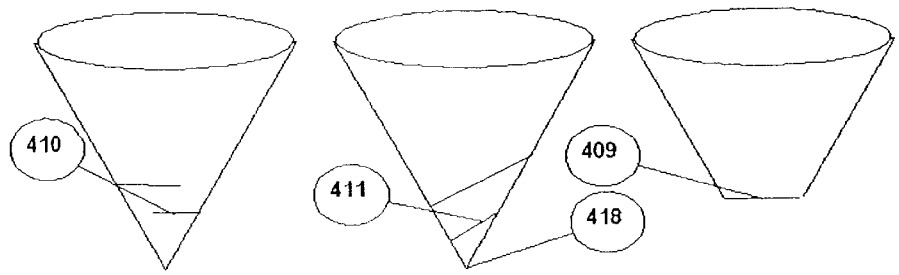
Fig 10c.
Fig 10.

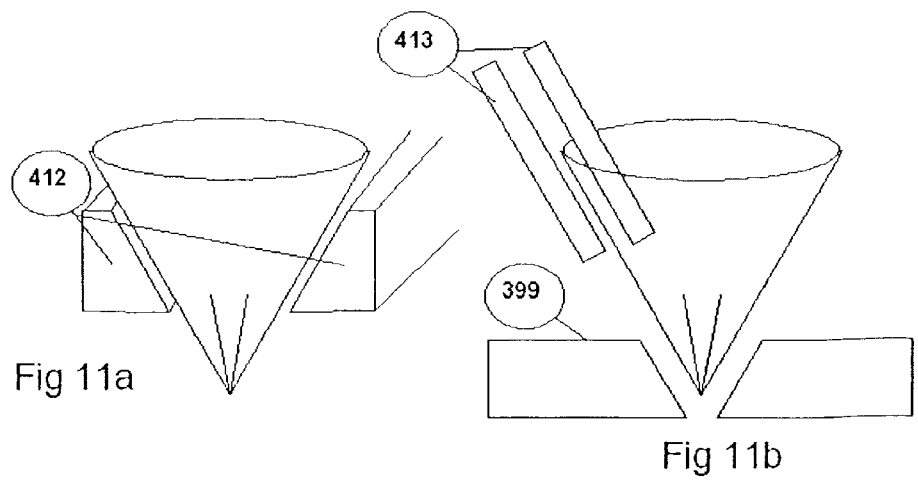
Fig 11a
Fig 11b
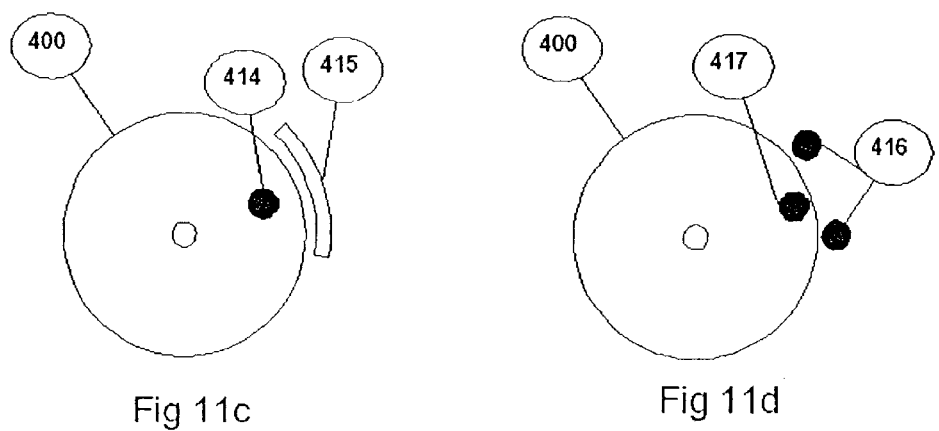
Fig 11c
Fig 11d
Fig 11

SELF CONTAINED FULLY AUTOMATED ROBOTIC CROP PRODUCTION FACILITY

This application is a CIP of PCT application US 00/23877 filed on Aug. 31,2000 which claims priority from U.S. patent application Ser. No. 09/387,793 filed on Sep. 1, 1999 and now issued as U.S. Pat. No. 6,243,987.

FIELD AND BACKGROUND OF THE INVENTION

The present invention relates to a method, system and devices for automating the production of crops. More specifically, the present invention relates to a closed unit, which can automatically seed, transfer, cultivate, and harvest a crop in an automatic fashion. Further specifically, the seeding, cultivation and harvest of the crop is performed by a robotic device which includes at least one robotic arm capable of manipulating and transferring from one place to another, seeds, seedlings, and mature plants ready for harvest. Further specifically, the present invention performs functions ancillary to the different stages of cultivation, including, but not limited to, irrigation, nutrient and mineral delivery, supply of light for photosynthesis, and regulation of O2/CO2 balance. Still further specifically, the present invention is designed to operate with minimal maintenance for an extended period of time, for example 6 months to one year.

Many vegetables are grown at a great distance from the place where they are finally consumed. As a result, plant geneticists have produced strains of plants that are able to withstand both prolonged periods of storage and transit over great distance. These traits have often been selected at the expense of other desirable traits such as flavor and texture. Undesirable flavor and texture is a problem, particularly for vegetables consumed uncooked, such as lettuce, tomato, cucumber, bell pepper, carrot, parsley, coriander, endive, escarole, kale, spinach and other salad ingredients.

With current societal trends in Japan, Europe and the United States, there is an increased demand for fresh produce for two reasons. First, there is a widespread belief among consumers that it is healthy to eat a diet rich in fiber, including many raw vegetables. Second, a much greater percentage of meals are eaten in restaurants than ever before. Restaurant proprietors demand an even higher quality of produce in terms of freshness, flavor and appearance, than typically considered satisfactory for the average home consumer.

Therefore, there is an increasing market for purchase of fresh produce directly from the grower, assuming that there are local growers available. In urban areas with a high population density there are typically many restaurants, which would like to purchase high quality produce. In these same urban areas, there are typically no vegetable farmers, due to the high cost of real estate as well as to local zoning laws and other regulations. In addition to these problems, many cities are located in areas where the climate is unsuitable for cultivation of vegetable crops, or where the climate is suitable only during a brief season of the year, or where the soil is unsuited to agricultural use.

Local zoning ordinances, together with existing buildings in urban areas, mean that it would often be advantageous to house a farm indoors, in a structure with limited daylight. Previously, construction of such a facility required considerable expertise. There is therefore a potential demand for a self-sustained modular farming unit that could easily be installed in a variety of locations, for example a warehouse, a vacant lot, or a service alley.

In order to overcome climatic problems, greenhouses are often used to grow vegetables. This solution can partially address climatic problems and allows more intensive use of each square meter of cultivation area than conventional agriculture. However, operation and maintenance of a commercial greenhouse requires considerable knowledge, skill and labor. These factors are required, for example, to decide which plants should be transferred from the germination area to the cultivation area and to effect such a transfer. In addition, real estate prices often dictate construction of greenhouses at a great distance from population centers. As a result, considerations of stability during transit and shelf life have led to development of greenhouse strains of vegetables with the same undesirable flavor and texture characteristics seen in their counterparts cultivated outdoors.

By using modem imaging technology as part of an integrated system, much of the knowledge, skill, and labor of the agricultural producer can be replaced. This option allows automation and installation of automated farms under the supervision of unskilled personnel, with only periodic visits by skilled personnel. Such an imaging system could be, for example, an ultrasonic system (as disclosed in, for example, U.S. Pat. No. 4,228,636), a video imaging system capable of measuring plant area and volume (as disclosed in, for example, U.S. Pat. No. 5,130,545), a non contacting optical imaging system (as disclosed in, for example, U.S. Pat. No. 5,150,175) which could detect and count leaf veins, an acoustic and video imaging system for quality determination of agricultural products (as disclosed in, for example, U.S. Pat. No. 5,309,374), or an imaging spectroradiometer (as disclosed in, for example, U.S. Pat. No. 5,424,543). U.S. Pat. Nos. 4,228,636; 5,130,545; 5,150,175; 5,309,374; 5,424,543 are all fully incorporated herein by reference including all references contained therein. Problems of soil quality can be overcome to a large extent by use of hydroponic or aeroponic technology. This solution offers even greater yield per unit of production area than a greenhouse, and is sometimes combined with greenhouse technology for that reason. Like the greenhouse though, a conventional hydroponic or aeroponic farm requires considerable knowledge, skill and labor although some steps of the hydroponic or aeroponic production cycles have been automated to a certain extent.

Prior art hydroponic or aeroponic greenhouses generally rely on daylight to provide an energy source for photosynthesis. For this reason, crops are produced only on an area less than or equal to the area of the greenhouse. This leaves a great percentage of the greenhouse volume unutilized. And limits total crop yield.

There is thus a great demand for, and it would be highly advantageous to have, a self contained automated farm for production of high quality vegetables in close proximity to urban centers. By offering high yield per unit area, and reduced labor and shipping costs, the present invention can meet that demand.

SUMMARY OF THE INVENTION

Thus, according to one aspect of the present invention there is provided an automated system for providing a continuous yield of fresh agricultural produce, the system comprising (a) a housing including a three dimensional seeding and germination zone, a three dimensional planting and growth zone and a three dimensional zone for holding automatic seeding, planting and harvesting equipment; (b) a plurality of seeding shelves being arranged in substantially horizontal layers in the three dimensional seeding and germination zone, each of the seeding shelves including a two dimensional array of seeding locations, each of the locations being for accepting a seed and for supporting development of a seedling; (c) a plurality of planting shelves being arranged in substantially horizontal layers in the three dimensional planting and growth zone, each of the planting shelves including a two dimensional array of planting locations, each of the locations being for accepting a seedling and for supporting development of a mature plant; and (d) a seeding, planting and harvesting robotic device being at the three dimensional zone for holding automatic seeding, planting and harvesting equipment, the robotic device including at least one robotic arm for seeding seeds being stored in a seed reservoir in the seeding locations, for planting seedlings in the planting locations and for harvesting mature plants from the planting locations.

According to another aspect of the present invention there is provided an automated method for providing agricultural produce, the method comprising the steps of (a) providing a housing including a three dimensional seeding and germination zone, a three dimensional planting and growth zone and a three dimensional zone for holding automatic seeding, planting and harvesting equipment; (b) installing within the housing a plurality of seeding shelves being arranged in substantially horizontal layers in the three dimensional seeding and germination zone, each of the seeding shelves including a two dimensional array of seeding locations, each of the locations being for accepting a seed and for supporting development of a seedling; (c) installing within the housing a plurality of planting shelves being arranged in substantially horizontal layers in the three dimensional planting and growth zone, each of the planting shelves including a two dimensional array of planting locations, each of the locations being for accepting a seedling and for supporting development of a mature plant; (d) installing within the housing a seeding, planting and harvesting robotic device being at the three dimensional zone for holding automatic seeding, planting and harvesting equipment, the robotic device including at least one robotic arm for seeding seeds being stored in a seed reservoir in the seeding locations, for planting seedlings in the planting locations and for harvesting mature plants from the planting locations; and (e) providing a regulatory mechanism which co-ordinates the actions of the robotic device so that seeds are planted within the seeding shelves, seedlings resulting from germination of the seeds are transferred to the planting shelves, and mature plants growing from the seedlings are harvested according to a pre-defined schedule.

According to yet another aspect of the present invention there is provided an automated system for providing a continuous yield of fresh seedlings, the system comprising (a) a housing including a three dimensional seeding and germination zone and a three dimensional zone for holding automatic seeding and seedlings transferring equipment; (b) a plurality of seeding shelves being arranged in substantially horizontal layers in the three dimensional seeding and germination zone, each of the seeding shelves including a two dimensional array of seeding locations, each of the locations being for accepting a seed and for supporting development of a seedling; (c) a seeding and seedlings transferring robotic device being at the three dimensional zone for holding automatic seeding and seedlings transferring equipment, the robotic device including at least one robotic arm for seeding seeds being stored in a seed reservoir in the seeding locations and for transferring germinated seedlings therefrom.

According to still another aspect of the present invention there is provided an automated system for providing a continuous yield of mature plants, the system comprising (a) a housing including a three dimensional planting and growth zone and a three dimensional zone for holding automatic seedling planting and plant harvesting equipment; (b) a plurality of planting shelves being arranged in substantially horizontal layers in the three dimensional planting and growth zone, each of the planting shelves including a two dimensional array of planting locations, each of the locations being for accepting a seedling and for supporting development of the mature plant; (c) a seedling planting and plant harvesting robotic device being at the three dimensional zone for holding automatic seedling planting and plant harvesting equipment, the robotic device including at least one robotic arm for planting seedlings in the planting locations and for harvesting mature plants grown in the planting locations.

According to another aspect of the present invention there is provided an automated system for providing a continuous yield of fresh agricultural produce. The system includes (a) a housing including a three dimensional seeding and germination zone, a three dimensional planting and growth zone and a three dimensional zone for holding automatic seeding, planting and harvesting equipment; (b) at least one seeding shelf in the three dimensional seeding and germination zone, the seeding shelf including a two dimensional array of seeding locations, each of the locations being for accepting a seed and for supporting development of a seedling; (c) at least one planting shelf in the three dimensional planting and growth zone, the at least one planting shelf including a two dimensional array of planting locations, each of the locations being for accepting a seedling and for supporting development of the mature plant; and (d) a seeding, planting and harvesting robotic device being at the three dimensional zone for holding automatic seeding, planting and harvesting equipment, the robotic device including at least one robotic arm for seeding seeds being stored in a seed reservoir in the seeding locations, for planting seedlings in the planting locations and for harvesting mature plants from the planting locations.

According to yet another aspect of the present invention there is provided an automated system for providing a continuous yield of fresh seedlings. The system includes (a) a housing including a three dimensional seeding and germination zone and a three dimensional zone for holding automatic seeding and seedlings transferring equipment; (b) at least one seeding shelf in the three dimensional seeding and germination zone, the seeding shelf including a two dimensional array of seeding locations, each of the locations being for accepting a seed and for supporting development of a seedling; and (c) a seeding and seedlings transferring robotic device being at the three dimensional zone for holding automatic seeding and seedlings transferring equipment, the robotic device including at least one robotic arm for seeding seeds being stored in a seed reservoir in the seeding locations and for transferring germinated seedlings therefrom.

According to still another aspect of the present invention there is provided an automated system for providing a continuous yield of mature plants. The system includes (a) a housing including a three dimensional planting and growth zone and a three dimensional zone for holding automatic seedling planting and plant harvesting equipment; (b) at least one planting shelf in the three dimensional planting and growth zone, the at least one planting shelf including a two dimensional array of planting locations, each of the locations being for accepting a seedling and for supporting development of the mature plant; and (c) a seedling planting and plant harvesting robotic device being at the three dimensional zone for holding automatic seedling planting and plant harvesting equipment, the robotic device including at least one robotic arm for planting seedlings in the planting locations and for harvesting mature plants grown in the planting locations.

According to another aspect of the present invention there is provided a system for continuous culture of an aquatic plant, the system includes (a) a housing including a three dimensional aquaculture zone and a three dimensional zone for aquaculture maintenance equipment; (b) at least one aquaculture shelf in the three dimensional aquaculture zone; and (c) an aquaculture robotic device being at the three dimensional zone for aquaculture maintenance equipment.

According to yet another aspect of the present invention there is provided a method for continuous culture of an aquatic plant. The method includes the steps of (a) providing a housing including a three dimensional aquaculture zone and a three dimensional zone for aquaculture maintenance equipment; (b) installing within the housing at least one aquaculture shelf in the three dimensional aquaculture zone; and (c) using an aquaculture robotic device to maintain the continuous culture of an aquatic plant.

According to still another aspect of the present invention there is provided a system for reducing a concentration of a heavy metal ion in a water supply. The system includes (a) a housing including a three-dimensional aquaculture zone and a three dimensional zone for aquaculture maintenance equipment; (b) at least one aquaculture shelf in the three dimensional aquaculture zone; and (c) an aquaculture robotic device being at the three dimensional zone for aquaculture maintenance equipment. The aquatic plant grown in the at least one aquaculture shelf is capable of effecting bioremediation of the heavy metal ion in the water supply.

According to another additional aspect of the present invention there is provided a method for reducing a concentration of a heavy metal ion in a water supply, the method includes the steps of (a) providing a housing including a three dimensional aquaculture zone and a three dimensional zone for aquaculture maintenance equipment; (b) installing within the housing at least one aquaculture shelf in the three dimensional aquaculture zone; (c) using an aquaculture robotic device to maintain the continuous culture of an aquatic plant. (d) allowing an aquatic plant grown in the at least one aquaculture shelf to absorb at least a portion of the heavy metal ion in the water supply; and (e) removing at least a portion of a biomass of the aquatic plant containing the at least a portion of the heavy metal ion in the water supply, thereby effecting bioremediation.

According to yet another additional aspect of the present invention there is provided a system for providing a continuous supply of a biomass of an aquatic plant. The system includes (a) a housing including a three dimensional aquaculture zone and a three dimensional zone for aquaculture maintenance equipment; (b) at least one aquaculture shelf in the three dimensional aquaculture zone; and (c) an aquaculture robotic device being at the three dimensional zone for aquaculture maintenance equipment.

According to still another additional aspect of the present invention there is provided a method for providing a continuous supply of a biomass of an aquatic plant. The method includes the steps of (a) providing a housing including a three dimensional aquaculture zone and a three dimensional zone for aquaculture maintenance equipment; (b) installing within the housing at least one aquaculture shelf in the three dimensional aquaculture zone; and (c) using an aquaculture robotic device to maintain the continuous culture of an aquatic plant; and (d) periodically harvesting at least a portion of the biomass of the aquatic plant.

According to further features in preferred embodiments of the invention described below, the any of the above systems further comprising at least one ancillary system selected from the group consisting of an irrigation system, a water conditioning system, a system for regulating oxygen/carbon dioxide balance, a system for regulating relative humidity, a lighting system, and a temperature control system.

According to still further features in the described preferred embodiments a system which handles mature plants further comprising a cutting and packaging zone, the cutting and packaging zone including a device for cutting roots from the mature plant and a device for wrapping the mature plant.

According to still further features in the described preferred embodiments, in a system which handles mature plants, each of the plurality of planting shelves includes a stabilized container or frame which contains the array of planting locations, the array of planting locations includes an incomplete matrix of (N×M−K) suspendably translatable platforms of substantially similar dimensions, each including the plurality of planting locations for accepting seedlings, each of the suspendably translatable platforms being movable to an adjacent free location in the incomplete matrix, such that each of the platforms is movable using one or more steps to a pre-defined position in the incomplete matrix, wherein N and M each independently an integer greater than one, K is an integer which equals at least one, whereas (N×M−K) has a result greater than one.

According to still further features in the described preferred embodiments, in a system which handles mature plants, N and M each independently equals at least 2, and further wherein K equals 1.

According to still further features in the described preferred embodiments, in a system which handles mature plants each of the suspendably translatable platforms is a float and further wherein the container includes an irrigation water reservoir over which the float suspendably translatably floats.

According to still further features in the described preferred embodiments, in a system which handles mature plants each of the suspendably translatable platforms is suspended over a suspending and translating mechanism.

According to still further features in the described preferred embodiments, in a system which handles seedlings the seedlings grow within a medium selected from the group consisting of an aqueous solution, air, an inert absorbent material, an artificial soil and natural soil.

According to still further features in the described preferred embodiments the robotic device is equipped with a system for evaluating a quality parameter of seedlings to be planted in the three dimensional planting and growth zone or of mature plants.

According to still further features in the described preferred embodiments the quality parameter is selected from the group consisting of seedling height, leaf color, leaf area, plant mass, fruit mass, fruit color and plant metabolic capacity.

According to still further features in the described preferred embodiments the planting and harvesting robotic device is further equipped with a system for evaluating a quality parameter of the at least one seedling, the evaluation is accomplished via a method selected from the group consisting of contrast ultrasonic imaging, video imaging, spectro-radiometry imaging and tactile sensing.

According to still further features in the described preferred embodiments each of the plurality of seeding shelves includes a stabilized container or frame which contains the array of seeding locations, the array of seeding locations includes an incomplete matrix of (P×L−Q) suspendably translatable platforms of substantially similar dimensions, each including the plurality of seeding locations for accepting seeds, each of the suspendably translatable platforms being movable to an adjacent free location in the incomplete matrix, such that each of the platforms is movable using one or more steps to a pre-defined position in the incomplete matrix, wherein P and L are each independently an integer greater than one, Q is an integer which equals at least one, whereas (P×L−Q) has a result greater than one.

According to still further features in the described preferred embodiments, P and L each independently equals at least 2, and further wherein K equals 1.

According to still further features in the described preferred embodiments each of the suspendably translatable platforms is a float and further wherein the container includes an irrigation water reservoir over which the float suspendably translatably floats.

According to still further features in the described preferred embodiments the float is formed with a plurality of seed accepting cavities, each of the cavities is open to an upper surface of the float and being in fluid communication with a channel formed in the float which opens at least to a bottom surface of the float, such that when the float floats over a water surface each of the plurality of cavities receives a seed, the seed is moistened but not submerged, whereas when the seed develops roots, the roots descend via the channel into the water, wherein a specific cavity and its adjacent channel facilitate a transfer of a germinated seedling including its roots.

According to still further features in the described preferred embodiments each of the suspendably translatable platforms is suspended over a suspending and translating mechanism.

According to still further features in the described preferred embodiments the seeds germinate within a medium selected from the group consisting of an aqueous solution, air, an inert absorbent material, an artificial soil and natural soil.

According to still further features in the described preferred embodiments the seeding, planting and harvesting robotic device includes a base horizontally translatable along a horizontal guiding rail attached to a floor of the housing at the zone for holding automatic seeding, planting and harvesting equipment, a vertical shaft element vertically extending from the base, and an operative head translatably engaged by the shaft and which is equipped with at least one rotating robotic arm, so as to allow a distal end of the robotic arm at least three degrees of freedom.

According to still further features in the described preferred embodiments the seeding, planting and harvesting robotic device further includes at least one motor oppressively engaged therewith for performing at least one task selected from the group consisting of horizontally translating the base along the horizontal guiding rail, vertically translating the operative head along the vertical shaft element and rotating the at least one robotic arm relative to the operative head.

According to still further features in the described preferred embodiments the at least one robotic arm is equipped with a grabbing mechanism located at a distal end thereof.

According to still further features in the described preferred embodiments the at least one robotic arm is constructed and designed so as to perform a task selected from the group consisting of picking up a seed, placing a seed, picking up a seedling, placing a seedling and picking up a mature plant.

According to an additional aspect of the present invention there is provided a device for cultivation of plants, the device comprising a container or frame engaging an incomplete matrix of (N×M−K) of suspendably translatable platforms of substantially similar dimensions each including a plurality of locations for accepting seeds or seedlings, each of the suspendably translatable platforms being movable to an adjacent free location in the incomplete matrix, such that each of the platforms is movable using one or more steps to a pre-defined position in the incomplete matrix, wherein N and M each independently an integer greater than one, K is an integer which equals at least one, whereas (N×M−K) has a result greater than one.

According to further features in preferred embodiments of the invention described below, the seeds or seedlings grow within a medium selected from the group consisting of an aqueous solution, air, an inert absorbent material, an artificial soil, and natural soil.

According to still further features in the described preferred embodiments the suspendably translatable platforms exist in the container or frame in a form selected from the group consisting of a float, a chamber filled with absorbent material, artificial soil or natural soil, a wheeled rack for suspending plants in the air, and a wheeled tray.

According to still further features in the described preferred embodiments N and M each independently equals at least 2, and further wherein K equals 1.

According to yet an additional aspect of the present invention there is provided a device for hydroponically nurturing seeds as they develop into seedlings, and for facilitating transfer of the seedlings, the device comprising a float being formed with a plurality of seed accepting cavities, each of the cavities being open to an upper surface of the float and being in fluid communication with a channel opening at least to a bottom surface of the float, such that when the float floats over a water surface and the cavities receive seeds, the each of the seeds is moistened but not submerged, whereas when the seeds develop roots, the roots descend via the channels into the water, wherein a specific cavity and its adjacent channel facilitate a transfer of a germinated seedling including its roots.

According to still another additional aspect of the present invention there is provided a device for nurturing seeds as they develop into seedlings, and for facilitating transfer of the seedlings. The device includes (a) a float being formed with a plurality of seed accepting cavities organized in pairs, each of the pairs having a first member and a second member; (b) the cavities, each being open to an upper surface of the float and being in fluid communication with a bottom surface of the float, such that when the float floats over a water surface and the cavities receive seeds, the each of the seeds is moistened; and (c) a cover with a plurality of holes corresponding to at least a portion of the cavities, whereas when the seeds develop roots, translational motion of the cover transfers each rooted seed from the first member of the pair of cavities to the second member of the pair of cavities.

According to still further features in the described preferred embodiments there is within the housing at least one additional zone for supporting development of at least one plant during a portion of a growth cycle.

According to still further features in the described preferred embodiments the housing is divided into at least two climatic zones, each of the climatic zones being individually controlled by a climate control system.

According to still further features in the described preferred embodiments the fresh agricultural produce is selected from the group consisting of a vegetable, a leafy vegetable, a flower, a fruit, a tree, a tuber, a fungus, a cereal grain, a genetically modified organism and an oilseed.

According to still further features in the described preferred embodiments the flower is selected from the group consisting of Sunflower, (Helianthus), Indian mustard (Brassica) and Alyssum.

According to still further features in the described preferred embodiments the tree is selected from the group consisting of Acacia, Willow (Salix) and Poplar (Populus).

According to still further features in the described preferred embodiments the genetically modified organism is produced from a genetically modified seed introduced into the housing.

According to still further features in the described preferred embodiments a defined environment within the housing activates production of a secondary metabolite by a plant grown therein.

According to still further features in the described preferred embodiments the secondary metabolite is harvestable from at least one location selected from the group consisting of at least a portion of the plant and a water supply of the plant.

According to still further features in the described preferred embodiments the genetically modified organism is produced within the housing by transforming a plant housed therein.

According to still further features in the described preferred embodiments the housing serves as a biohazard containment facility.

According to still further features in the described preferred embodiments the housing is constructed of at least one item selected from the group consisting of at least one 20 ft. shipping container and at least one 40 foot shipping container.

According to still further features in the described preferred embodiments the housing is airtight such that utilization of $CO_2$ deployed therein is more efficient.

According to still further features in the described preferred embodiments the seeding and seedling transferring robotic device includes a base attached to the housing at the zone for holding automatic seeding, planting and harvesting equipment, a vertical shaft element vertically extending from the base, and an operative head translatably engaged by the shaft which is equipped with at least one robotic arm, so as to allow a distal end of the robotic arm at least one degree of freedom.

According to still further features in the described preferred embodiments the seeds in the seed reservoir are selected from the group consisting of monocotyledonous seeds, dicotyledonous seeds, at least a portion of a plant, spores, rooted plugs and tissue culture material.

According to still further features in the described preferred embodiments the at least a portion of a plant contains at least one item selected from the group consisting of at least a portion of a leaf, at least a portion of a flower, at least a portion of a stem and at least a portion of a root.

According to still further features in the described preferred embodiments the fresh seedling is a seedling of a plant selected from the group consisting of a vegetable, a leafy vegetable, a flower, a fruit, a tree, a tuber, a fungus, a cereal grain, a genetically modified organism and an oilseed.

According to still further features in the described preferred embodiments the mature plants are selected from the group consisting of a vegetable, a leafy vegetable, a flower, a fruit, a tree, tuber, and a genetically modified organism.

According to still further features in the described preferred embodiments the aquatic plant is selected from the group consisting of a submerged plant, a floating plant, a yeast, a fungus, an algae, a blue-green algae, and other micro-organisms.

According to still further features in the described preferred embodiments the floating plant belongs to a genus selected from the group of genera consisting of Salvinia, Azolla, Eichomia and Lemna.

According to still further features in the described preferred embodiments the submerged plant belongs to a genus selected from the group of genera consisting of Myriophillum, Nimphoides, Nymphaea and Ludwigia.

According to still further features in the described preferred embodiments the robotic device is designed and constructed to periodically harvest at least a portion of a biomass of the aquatic plant.

According to still further features in the described preferred embodiments the system further includes a device for performing at least one action selected from the group consisting of drying, crumbling, powderizing and grinding at least a portion of a biomass of the aquatic plant.

According to still further features in the described preferred embodiments harvest of at least a portion of a biomass of the aquatic plant is effected by filtration of at least a portion of an aquaculture in the at least one aquaculture shelf.

According to still further features in the described preferred embodiments the system further includes within the housing at least one additional zone for supporting development of at least one aquatic plant during a portion of a growth cycle.

According to still further features in the described preferred embodiments the housing is divided into at least two climatic zones, each of the climatic zones being individually controlled by a climate control system.

According to still further features in the described preferred embodiments a genetically modified aquatic plant is introduced into the housing and cultured therein.

According to still further features in the described preferred embodiments a defined environment within the housing activates production of a secondary metabolite by the aquatic plant grown therein.

According to still further features in the described preferred embodiments the secondary metabolite is harvestable from at least one location selected from the group consisting of at least a portion of the aquatic plant and a water supply of the aquatic plant.

According to still further features in the described preferred embodiments a genetically modified aquatic plant is produced within the housing by transforming an aquatic plant housed therein.

According to still further features in the described preferred embodiments the housing serves as a biohazard containment facility.

According to still further features in the described preferred embodiments the housing is constructed of at least one item selected from the group consisting of at least one 20 ft. shipping container and at least one 40 foot shipping container. Alternately, another thermally isolated housing with similar dimensions is employed.

According to still further features in the described preferred embodiments the housing is airtight such that utilization of $CO_2$ deployed therein is more efficient.

According to still further features in the described preferred embodiments the robotic device includes a base attached to the housing at the zone for aquaculture maintenance equipment, a vertical shaft element vertically extending from the base, and an operative head translatably engaged by the shaft which is equipped with at least one robotic arm, so as to allow a distal end of the robotic arm at least one degree of freedom.

According to still further features in the described preferred embodiments the at least one robotic arm is equipped with a tool selected from the group consisting of a comb, a net, a filter, a scoop and a strainer such that the robotic arm can be employed to effect a harvest of at least a portion of a biomass of the aquatic plant.

According to still further features in the described preferred embodiments the fluid communication with the bottom surface of the float is through an item selected from the group consisting of a screen and a liquid permeable membrane.

According to another aspect of the present invention there is provided a device for nurturing a seed as it develops into a seedling, and for facilitating transfer of the seedling. The device includes: (a) a cup holder being formed with at least one cavity capable of accepting a transferable cup; and (b) the transferable cup seatable within each of the at least one cavity. The cavity is open to an upper surface of the cup holder. The cup is capable of accepting and retaining a seed.

According to yet another aspect of the present invention there is provided an automated method for growing a plant to a desired stage of maturity. The method includes: (a) providing a housing including at least one three dimensional plant growth zone and a three dimensional zone for holding automatic robotic equipment;(b) installing within the housing a plurality of cup holders, each of the cup holders being formed with at least one cavity capable of accepting a transferable cup, the cavity being open to an upper surface of the cup holder; and (c) providing a plurality of the transferable cups seatable within each of the at least one cavity, the cups capable of accepting and retaining a seed or plant, therein; (d) installing within the housing a robotic device being at the three dimensional zone for holding automatic robotic equipment, the robotic device including at least one robotic arm for placing a seed or plant into a cup of the transferable cups, for placing the cup into a cup holder of the cup holders and for removing the cup from the cup holder when the desired stage of maturity is reached; and (e) providing a regulatory mechanism which co-ordinates the actions of the robotic device so that seeds or plants are placed in the cups, the cups are placed in the cup holders and plants are harvested at a desired stage of maturity according to a pre-defined schedule.

According to still another aspect of the present invention there is provided a device for guiding exposed roots of a plant accurately to a target location during a transfer. The device includes a mechanism for directing a stream of water downward along the exposed roots so that the roots are grouped and straightened.

According to an additional aspect of the present invention there is provided a method for guiding exposed roots of a plant accurately to a target location during a transfer, the method includes directing a stream of water downward along the exposed roots so that the roots are grouped and straightened and guiding the straightened roots to the target location.

According to yet another additional aspect of the present invention there is provided a method of recycling and oxygenating irrigation water. The method includes:(a) providing at least one first cultivation shelf designed and constructed to contain at least a portion of the irrigation water; (b) allowing at least part of the at least a portion of the irrigation water to flow downwards out of the first cultivation shelf and mixing the part of the at least a portion of the irrigation water with air; and (c) introducing the part of the at least a portion of the irrigation water into a second cultivation shelf situated below the first cultivation shelf.

According to still additional aspect of the present invention there is provided a system for recycling and oxygenating irrigation water, the system includes:(a) at least one first cultivation shelf designed and constructed to contain at least a portion of the irrigation water and including a regulatory element; (b) the regulatory element designed and constructed to allow a part of the at least a portion of the irrigation water to flow downwards out of the first cultivation shelf into a mechanism for mixing; (c) the mechanism for mixing being in fluid communication with the first cultivation shelf and a second cultivation shelf, and being designed and constructed to receive the part of the at least a portion of the irrigation water with air to produce aereated water and to transfer the aereated water to a the second cultivation shelf; and (d) the second cultivation shelf situated below the first cultivation shelf, the second shelf designed and constructed to contain at least a portion of the irrigation water.

According to still further features in the described preferred embodiments the device further includes a quantity of gel which serves to absorb moisture from a water supply and transfer the moisture to the seed. The gel may further serve to prevent the seed from falling into the water, and to provide the seeds with required nutrients, preferably all required nutrients.

According to still further features in the described preferred embodiments the quantity of gel resides in a location selected from the group consisting of the at least one cavity and the transferable cup.

According to still further features in the described preferred embodiments the cup contains at least one opening large enough for a root originating from the seed to pass through.

According to still further features in the described preferred embodiments the at least one opening may include at least one slot capable of expanding to accommodate a growing root.

According to still further features in the described preferred embodiments the gel contains nutrients to foster development of the seedling, the nutrients being delivered to the seed as the moisture flows through the gel to the seed.

According to still further features in the described preferred embodiments the transferable cup has a shape selected from the group consisting of conical, tetrahedral, pyramidic, cylindrical and portions thereof and combinations thereof.

According to still further features in the described preferred embodiments the device further includes a robotic device designed and constructed to engage a transferable cup and seat the transferable cup in a cavity belonging to the at least one cavity of the cup holder.

According to still further features in the described preferred embodiments the method employs the robotic device to effect a transfer of the transferable cup from a first cup holder to a second cup holder when an intermediate stage of maturity is reached.

According to still further features in the described preferred embodiments the method further includes directing a stream of water downward along exposed roots of a plant residing in the transferable cup so that the roots are straightened and thereby guided accurately to a target location in the second cup holder during the transfer.

According to still further features in the described preferred embodiments the mechanism for directing a stream of water operates in conjunction with a robotic device engaged in transfer of the plant.

According to still further features in the described preferred embodiments the mechanism for directing a stream of water and the robotic device are physically connected one to the other.

According to still further features in the described preferred embodiments the guiding is accomplished by a robotic device engaged in transfer of the plant.

According to still further features in the described preferred embodiments allowing the part of the at least a portion of the irrigation water to flow downwards out of the first cultivation shelf occurs when the irrigation water reaches a predetermined depth within the first irrigation shelf.

According to still further features in the described preferred embodiments mixing the part of the at least a portion of the irrigation water with air is accomplished by introducing the part of the at least a portion of the irrigation water into a cavity containing the air.

According to still further features in the described preferred embodiments the method further includes returning the part of the at least a portion of the irrigation water to the first cultivation shelf.

According to still further features in the described preferred embodiments the regulatory element includes a gate having a height. Therefore, when a depth of the irrigation water in the first cultivation shelf exceeds the height, a part of the at least a portion of the irrigation water flows downwards out of the first cultivation shelf.

According to still further features in the described preferred embodiments the mechanism for mixing operates by introducing the part of the at least a portion of the irrigation water into a cavity containing the air.

According to still further features in the described preferred embodiments the system further includes a pump designed and constructed to return the part of the at least a portion of the irrigation water to the first cultivation shelf.

According to still further features in the described preferred embodiments any of the systems described hereinabove may include at least one transferable cup designed and constructed to be seatable and retainable within the seeding locations and/or the planting locations and to be manipulatable by the robotic arm.

According to still further features in the described preferred embodiments any of the systems described hereinabove may include a mechanism for directing a stream of water downward along an exposed root during planting so that a transfer of a seedling from a seeding shelf to a planting shelf, or from a planting shelf to a growing shelf is more easily accomplished by the robotic device.

According to still further features in the described preferred embodiments any of the systems described hereinabove may include a water recycling and aereation system operating at a location selected from the group consisting of the at least one seeding shelf in the three dimensional seeding and germination zone, the at least one planting shelf in the three dimensional planting and growth zone and a combination thereof.

According to still further features in the described preferred embodiments plants are harvested in cups.

The present invention successfully addresses the shortcomings of the presently known configurations by providing a system and method for producing a continuous yield of high quality seedlings or produce with minimal labor input. In addition, the present invention facilitates increased production per unit area, making cultivation of crops on high cost property an economically viable option. The present invention further provides systems and methods for producing a continuous yield of aquatic plants, biomass derived therefrom, or geneticically modified organisms with minimal labor input.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 6 is a top view of a distal end or a robotic arm according to the present invention;

FIG. 7 is a top view of an aquaculture shelf and an aquaculture robotic device according to the present invention;

FIG. 8 is a cutaway view of a device for nurturing seeds as they develop into seedlings, and for facilitating transfer of the seedlings, according to the present invention;

FIG. 9 is a cutaway view of an additional embodiment of a device for nurturing seeds as they develop into seedlings, and for facilitating transfer of the seedlings;

FIGS. 10a–c are side views of various configurations of transferable cups according to the present invention;

FIGS. 11a–d illustrate engagement of a transferable cup according to the present invention by a robotic device;

DESCRIPTION OF THE PREFERRED EMBODIMENTS

Figure 1:
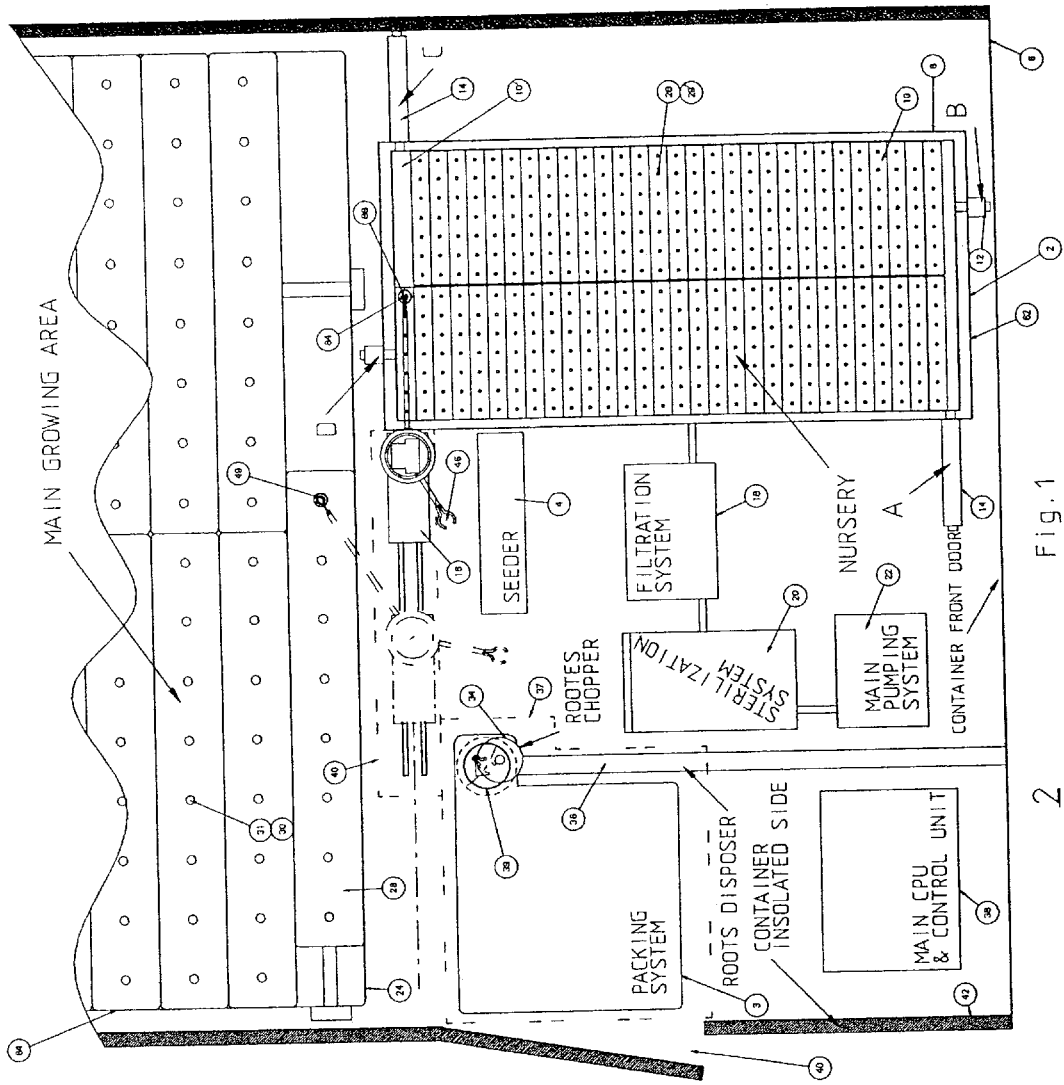
FIG. 1 is a top view of the automated system for providing a continuous yield of fresh agricultural produce of the present invention.

The present invention is of an automated system, method and devices for providing a continuous yield of fresh agricultural produce. As if further detailed and exemplified hereinunder, the system according to the present invention includes a three dimensional seeding and germination zone including seeding shelves arranged in substantially horizontal layers, a three dimensional planting and growth zone including planting shelves arranged in substantially horizontal layers, and a three dimensional zone for holding automatic seeding, planting and harvesting equipment including a robotic device with at least one robotic arm for seeding seeds stored in a seed reservoir in seeding locations in the seeding and germination zone, for planting seedlings in planting locations in the planting and growth zone and for harvesting mature plants from the planting locations, which can be operated automatically for a prolonged period of time substantially without human intervention.

Specifically, the present invention can be used to transform a reservoir of seeds into a supply of fresh produce according to a pre-determined time schedule. Alternatively or additionally, the present invention can be used to transform a reservoir of seeds into a supply of seedlings according to a pre-determined time schedule. Still alternatively or additionally, the present invention can be used to transform a supply of seedlings into a supply of mature plants according to a pre-determined time schedule.

The principles and operation of an automated system and method for providing a continuous yield of fresh agricultural produce according to the present invention may better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

For purposes of this specification and the accompanying claims, the term "irrigation system" refers to any device or system used to deliver at least water, but possibly also minerals, nutrients, fertilizers, and other materials deemed necessary to promote germination of seeds and subsequent growth of plants from those seeds. An irrigation system includes a supply of water, a delivery mechanism and any necessary conduits or tubes necessary to conduct the water to cultivation zone(s). An irrigation system may further include additional components, including, but not limited to, a filtration system, a sterilization system, and a de-ionizing component. Such systems are well known in the art.

For purposes of this specification and the accompanying claims, the term "delivery mechanism" refers to any device or system, which causes water to flow into the conduits or pipes of an irrigation system. A delivery mechanism therefore includes, but is not necessarily limited to, various types of pumps, gravity feed systems, flow regulators, and timers. In its broadest sense, the term delivery mechanism can be construed to include any device or system, which regulates either the flow rate or the temporal distribution, or both, of water and other aqueous solutions.

For purposes of this specification and the accompanying claims, the term "plant" refers to a plant in any stage of development, including but not limited to, a seed, a seedling and a mature plant or parts thereof.

For purposes of this specification and the accompanying claims, the term "mature plant" refers to a plant, including but not limited to, a vegetable, at a stage of growth generally considered desirable for harvest for subsequent consumption by human beings. Mature plant in this sense is not necessarily a physiologic definition, e.g., a mature plant may, or may not be, sexually mature and may, or may not contain, fertile or fertilizable seeds.

For purposes of this specification and the accompanying claims, the terms "shelf" and "shelves" refer to container(s), holder(s), frame(s) or other construction(s) with sufficient depth and strength to carry or hold material sufficient for sustaining plant growth. According to some embodiments of the present invention, that material for sustaining plant growth is an aqueous growth media. According to alternative embodiments that material sufficient for sustaining plant growth is a solid media, such as soil or artificial soil, or a gaseous media such as air or water vapor.

For purposes of this specification and the accompanying claims, a "climate control system" is any system which regulates at least one parameter relating to climate, including but not limited to, oxygen/carbon dioxide balance, relative humidity, lighting, acidity/alkalinity, O2 saturation and temperature. According to various preferred embodiments of the invention, temperature may refer to either air or water temperature. According to various preferred embodiments of the invention, acidity/alkalinity may refer to either soil or water pH. According to various preferred embodiments of the invention, O2 saturation may refer to either air or water O2 saturation.

For purposes of this specification and the accompanying claims, the phrase "genetically modified organism" (GMO) includes any transformed organism. As used herein in the specification and in the claims section that follows the term "transform" and its conjugations such as transformation, transforming and transformed, all relate to the process of introducing heterologous nucleic acid sequences into a cell or an organism. The term thus reads on, for example, "genetically modified", "transgenic" and "transfected" or "viral infected" and their conjugations, which may be used herein to further describe the present invention.

For purposes of this specification and the accompanying claims, the phrase "biohazard containment " may refer, for example to Level I, II, or III containment.

For purposes of this specification and the accompanying claims, the phrase "continuous culture" refers to any culture which prolongs the growth phase and delays entry into the death phase. While the length of time a continuous culture may be maintained is theoretically unlimited, in practice some constraints on maximum culture propagation time may exist.

For purposes of this specification and the accompanying claims, the phrase "fluid communication" refers equally to an open channel, a channel covered by a screen and a channel covered by a liquid permeable membrane.

Referring now to the drawings, FIG. 1 illustrates a top view of the automated system for providing a continuous yield of fresh agricultural produce according to the present invention, which is referred to hereinbelow as system 2.

System 2 according to the present invention includes a housing 6 which is preferably formed with insulating walls 42. Housing 2 is subdivided into a three dimensional seeding and germination zone 8 which, as is further detailed hereinunder, includes horizontal layers of seeding shelves 62, a three dimensional planting and growth zone 24 which, as is further detailed hereinunder, includes horizontal layers of planting shelves 64, and a three dimensional zone, which, as is further detailed hereinunder, serves for holding automatic seeding, planting and harvesting equipment 40.

According to a preferred embodiment of the present invention housing 6 is a standard container designed for shipment of goods, which is modified to include all the components of system 2 as is further detailed hereinunder. The use of a standard container is presently preferred because such a container has sufficient structural rigidity to enable safe shipment of system 2 to different locations world-wide without the need for further packaging, disassembling and the like. According to specific embodiments of the present invention, a 20 feet long refrigeration container, for example of the type sold by TRS containers (Avenel, N.J.), is modified to serve as housing 6 of system 2 according to the present invention, although other constructions could equally fulfill this function. The use of a standard container allows the use of a plurality of such containers which can be arranged in a containers farm one on the side or the top of the other, to thereby save space. Such an arrangement is enabled due to the structural rigidity of standard containers.

Production of agricultural produce according to the present invention begins with the introduction of a supply of seeds into a seed reservoir 4. Seeds are removed from seed reservoir 4 by a seeding, planting and harvesting robotic device 16 using a robotic arm 44 which serves for seeding the seeds. As is further detailed hereinunder, arm 44 is equipped with a mini-finger gripper at its distal end, for example of the type sold by Sommer Automatic (U.S.) which is capable of picking up a seed, carrying the seed to seeding and germination zone 8 and accurately dropping the seed thereat.

According to some embodiments of the present invention, seeds are sequentially fed to the seeding, planting and harvesting robotic device 16 by an automatic seeding machine which is installed in seed reservoir 4.

Figure 2:
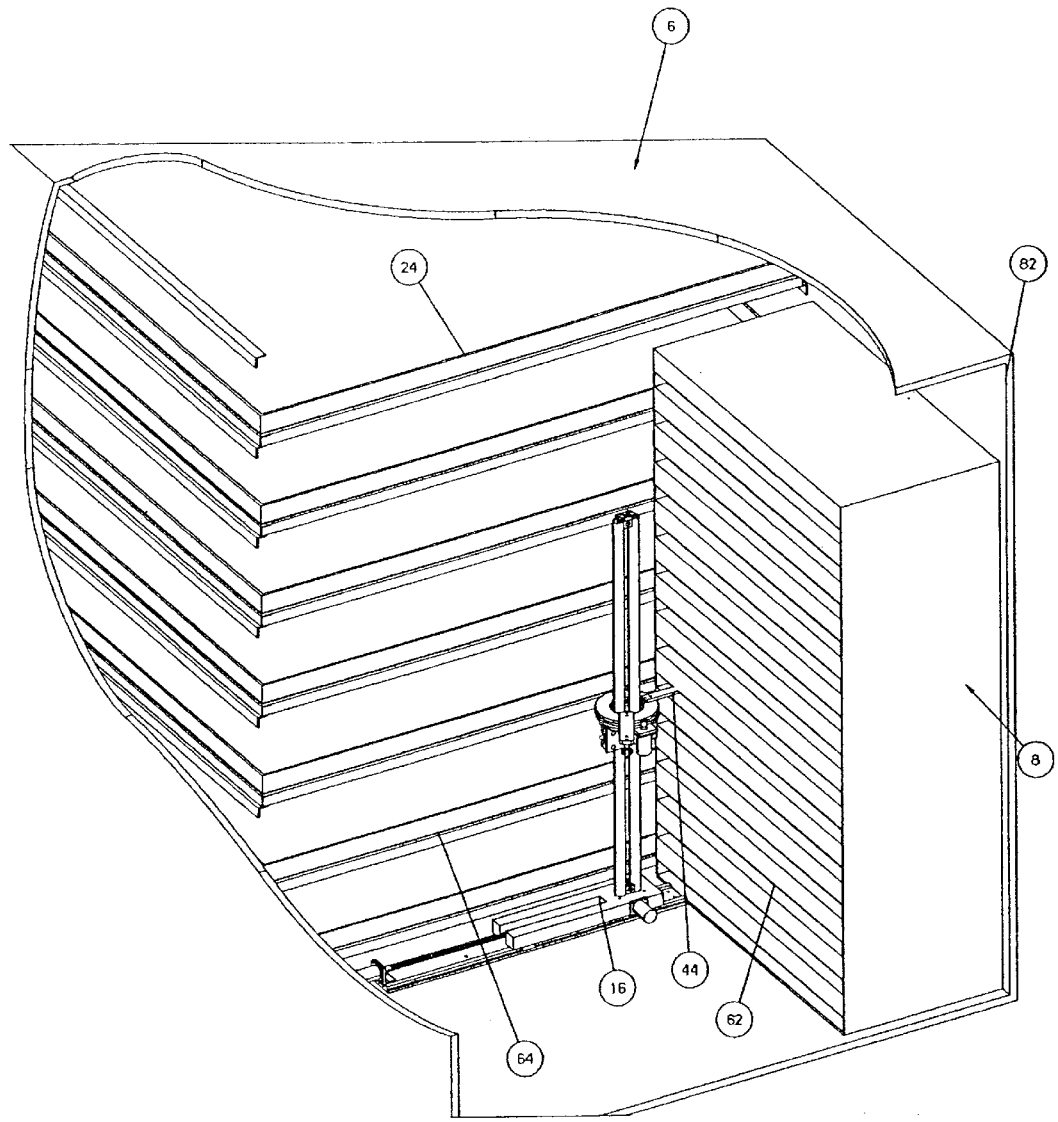
FIG. 2 is a perspective view of the system showing the spatial relationship between the seeding, planting and harvesting robotic device, the seeding and germination zone, and the planting and growth zone.

Thus, robotic arm 44 brings the seed to a predetermined seeding location 48 located in seeding and germination zone 8. To this end, seeding and germination zone 8 contains a vertical stack (best seen in FIG. 2) of seeding shelves 62 which are accessible to robotic arm 44. Each seeding shelf 62 contains a two dimensional array of seeding locations 28 preferably in the form of seed accepting cavities 29, a preferred embodiment thereof is further described hereinunder.

Figure 5:
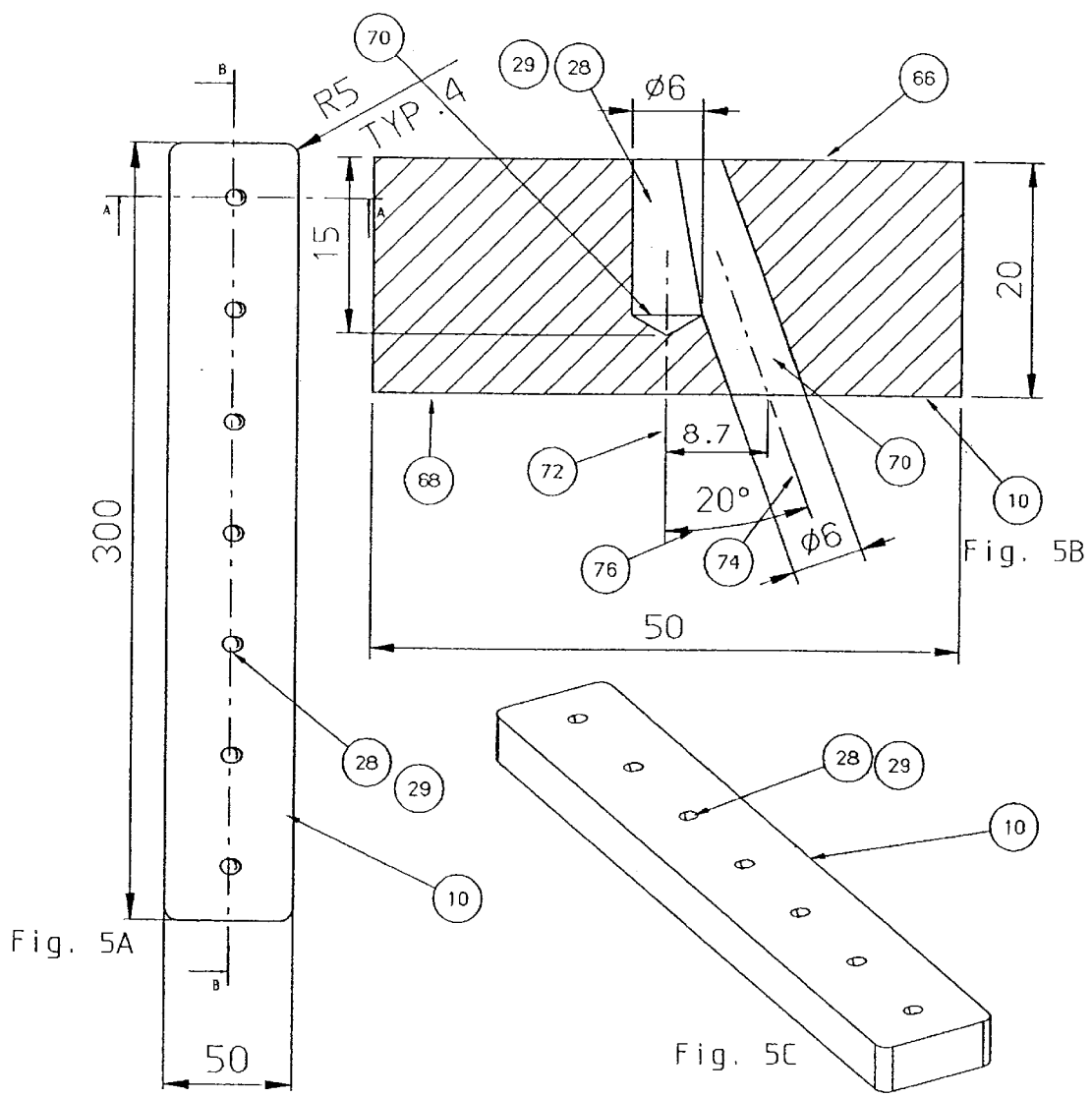
FIG. 5a is a top view of a device for hydroponically germinating seeds according to the present invention.
FIG. 5b is a cross sectional view of the device for hydroponically germinating seeds according to the present invention.
FIG. 5c is a perspective view of a device for hydroponically germinating seeds according to the present invention.

According to preferred embodiments of the present invention, the array of seeding locations is made up of an incomplete matrix of suspendably translatable platforms 10 (best seen in FIGS. 5a–c) of substantially similar dimensions, each including a plurality of seed accepting cavities 29 each serves for accepting an individual seed. Suspendably translatable platforms 10 pictured in FIGS. 1 and 5 each contain 7 cavities 29, although a smaller or greater number could be in each suspendably translatable platform 10 depending on the size of seeding shelves 62 and the crop to be cultivated.

According to specific embodiments of the present invention, each of suspendably translatable platforms 10 is movable to an adjacent free location 10' within an incomplete matrix of dimensions (P×L–Q), such that each of platforms 10 is movable using one or more steps to a pre-defined position 48 within the incomplete matrix, wherein P and L are each independently an integer greater than one, K is an integer which equals at least one, and (P×L–Q) has a result greater than one. In the pictured embodiment, movement of suspendably translatable platforms 10 is accomplished by pistons 12 and 14, the pistons being under the control of a computerized CPU 38, which has additional functions as is further detailed hereinunder.

For example, if each suspendably translatable platform contains 7 seed accepting cavities (as is pictured in FIG. 1) and P and L each equals 2, while Q equals 1, 21 seed accepting cavities 28 will be sequentially filled by the seeding arm 44 of robotic device 16 as they pass under pre defined position 48 for accepting a seed.

Alternatively, if each suspendably translatable platform contains 7 seed accepting cavities, P is 2, L is 10 and Q is 1, 133 seed accepting cavities 28 will be sequentially filled by the seeding arm 44 of robotic device 16 as they pass under pre defined position 48 for accepting a seed.

Increasing P to 3 while all other parameters remain constant means that 203 seed accepting cavities will be sequentially filled by the seeding arm 44 of robotic device 16 as they pass under pre defined position 48 for accepting a seed.

According to some specific embodiments, germination of seeds is performed under hydroponic conditions. In this case, suspendably translatable platforms 26 take the form of floats 66 which suspendably and translatably float over the surface of an irrigation water reservoir held within a container, forming seeding shelf 62. These floats 66 contain seed accepting cavities which, as best seen in FIG. 5b, have a special configuration, wherein each of seed accepting cavities 29 is open to an upper surface of float 66 and is also in fluid communication with a channel 70 opening at least to a bottom surface of float 66, such that when float 66 floats over a water surface and cavities 29 receive seeds, each seed lodges in the closed lower end 70 of cavity 29 where it is moistened, but not submerged.

When the seeds develop roots, the roots descend via channels 70 into the water. The net effect is that a specific cavity 29 and its adjacent channel 70 facilitate transfer of a germinated seedling including its roots out of seeding and germination zone 8.

Depicted in FIG. 5b is one embodiment of such a float where an angle 76 between a longitudinal axis 72 of a seed accepting cavity 29 and a longitudinal axis 74 of its respective channel 70 is 20 degrees. Other angles between 0 and 90 degrees could also be employed in such a float 66.

Important to the function of system 2 according to this embodiment of the present invention is the arrangement of seed accepting cavities 29 in a straight line within suspendably translatable platforms 10 so that they may be brought sequentially under a pre defined position 48, for accepting a seed.

According to alternative embodiments of the present invention each of suspendably translatable platforms 10 is suspended over a suspending and translating mechanism and is movable by a method, such as, but not limited to, floatation on the surface of a liquid (as described above), rolling on balls, rolling on beads, rolling on bearings, rolling on attached rotating wheels and sliding on a surface coated with an essentially friction free material.

According to alternative embodiments of the present invention, seedlings grow within a medium, such as, but not limited to, an aqueous solution, air, and an inert absorbent material, an artificial soil or a natural soil.

After a period of time, which is dependent upon the crop under cultivation, seedlings will be large enough that they require transfer out of seeding shelves 62. This transfer is accomplished by seeding, planting and harvesting robotic device 16 using, for example, robotic arm 44 which is equipped with a mini-finger gripper at its distal end which seeded the seeds. Thus, robotic device 16 now functions as a seedlings transferring and planting device.

According to preferred embodiments of the present invention, this transfer is to a planting shelf 64 in the planting and growth zone 24. More specifically, transfer is to a seedling accepting cavity 30, which has been positioned at a pre-defined position for planting a seedling 49 as is further detailed below.

Planting and growth zone 24 contains a vertical stack (FIG. 2) of planting shelves 64 which are accessible to transferring and planting robotic arm 44. Each planting shelf 64 contains a two dimensional array of planting locations 30 in the form of seedling accepting cavities 31.

According to preferred embodiments of the invention, the array of planting locations is made up of an incomplete matrix of suspendably translatable platforms 26 (FIG. 1) of substantially similar dimensions, each including a plurality of seedling accepting cavities 31 for accepting seedlings. Suspendably translatable platforms 26 pictured in FIG. 1 each contain 8 cavities 31, although a smaller or greater number could be in each suspendably translatable platform 26 depending on the size of seeding shelves 64 and the crop to be cultivated.

According to specific embodiments of the present invention, each of suspendably translatable platforms 26 is movable to an adjacent free location within an incomplete matrix of dimensions (N×M−K), such that each of the platforms is movable using one or more steps to a pre-defined position 49 within the incomplete matrix, wherein N and M are each independently an integer greater than one, K is an integer which equals at least one, and (N×M−K) has a result greater than one.

For example, if each suspendably translatable platform contains 8 planting locations 30 for accepting seedlings (as is pictured in FIG. 1) and N and M each equals 2, while K equals 1, 24 planting locations 30 for accepting seedlings will be sequentially filled by seedling planting robotic device 16 as they pass under pre defined position 49 for accepting a seedling.

Alternatively, if each suspendably translatable platform 26 contains 8 planting locations 30 for accepting seedlings, N is 2, M is 10 and K is 1, 152 planting locations 30 for accepting seedlings will be sequentially filled by the seedling planting robotic device 16 as they pass under pre-defined position 49 for accepting a seedling.

Increasing N to 3 while all other parameters remain constant means that 232 planting locations 30 for accepting seedlings will be sequentially filled by the seedling planting robotic device 16 as they pass under pre-defined position 48 for accepting a seedling.

According to some specific embodiments, growth of seedlings to mature plants is under hydroponic conditions. In this case, suspendably translatable platforms 26 take the form of suspendably and translatably floats, which float over the surface of an irrigation water reservoir in a container which form a planting shelf 64. As the roots of the seedlings develop, they spread out in the irrigation water. The net effect is that a planting location 30 for accepting seedlings facilitates transfer of a mature plant, including its roots, out of the planting and growth area. Important to the function of system 2 is the arrangement of planting locations 30 for accepting seedlings in a straight line within suspendably translatable platforms 26 so that they may be brought sequentially under pre-defined position 49 for accepting a seedling.

Following an additional period of time, which is also dependent upon the crop under cultivation, the seedlings become mature plants ready for harvest. The harvesting is accomplished by robotic device 16, which now serves as a plant harvesting robotic device, using a second robotic arm 46 with a large finger gripping device at its distal end. This harvesting robotic arm lifts the plant, with its roots, out of its planting location 30, and transfers it to a cutting and packaging zone 37 within housing 6.

According to some embodiments, mature plants are collected at this stage from cutting and packaging zone 37 by personnel accessing zone 37 through opening 40 formed in housing 6.

According to preferred embodiments of the present invention, cutting and packaging zone 37 includes a roots removing device 34 which serves for cutting roots from the mature plant and a wrapping device 32 which serves for wrapping the mature plant. Device 34 may employ, for example, a circular saw blade 39 such as a panel sizing saw blade (Leuco). Cut off roots exit housing 6 via a chute 36 below root cutting device 34. After root cutting, harvesting robotic arm 46 transfers the harvested mature plant to device 34 for wrapping. Plant automatic wrapping devices are well known in the art. Wrapped mature plants are either stored in cutting and packaging zone 37 for subsequent collection therefrom by personnel accessing zone 37 through opening 40 or exit housing 6 of system 2 via a dedicated exit chute.

Figure 3:
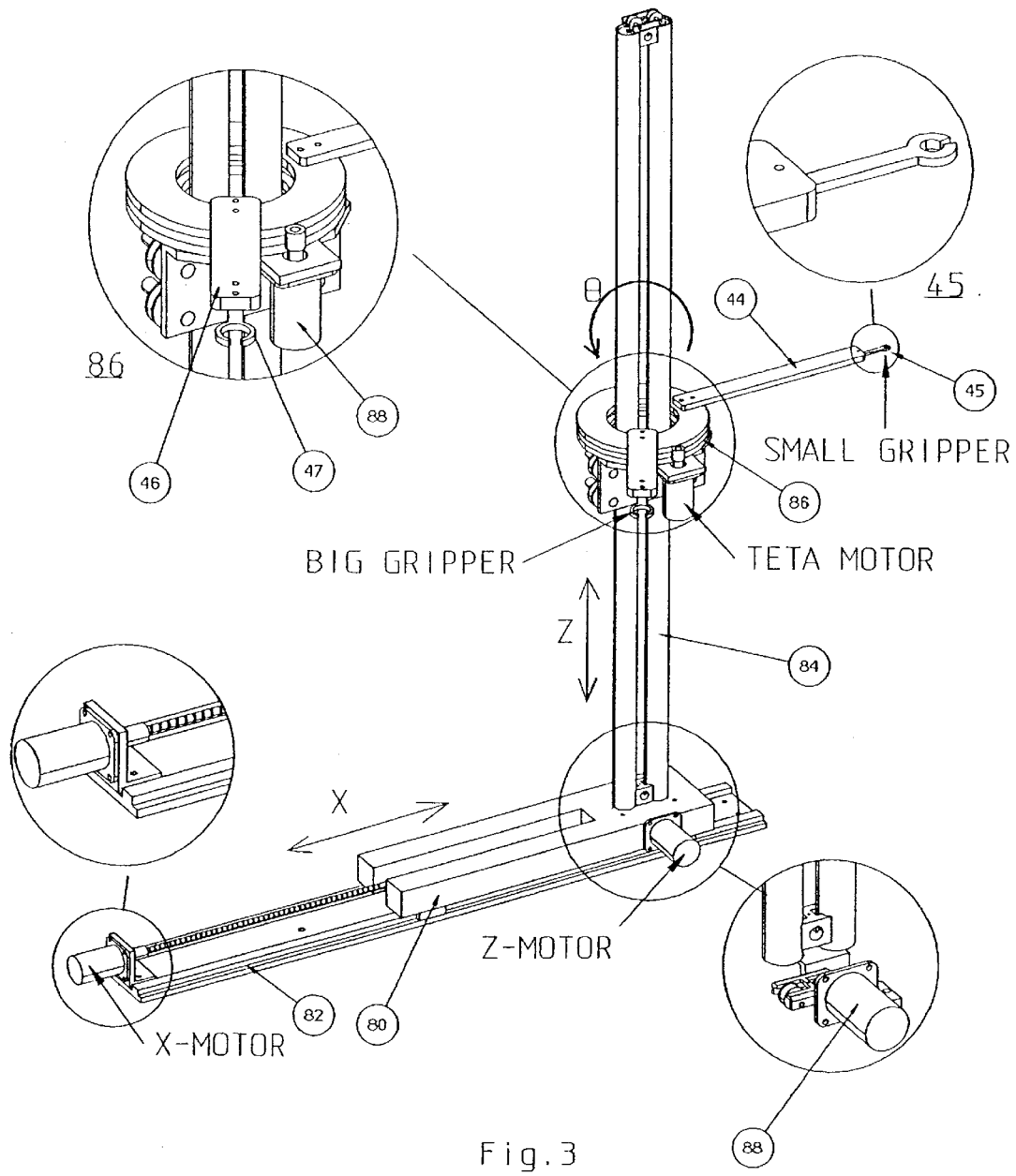
FIG. 3 is a perspective view accompanied by blowups of the robotic device used in the system according to the present invention.
Figure 4:
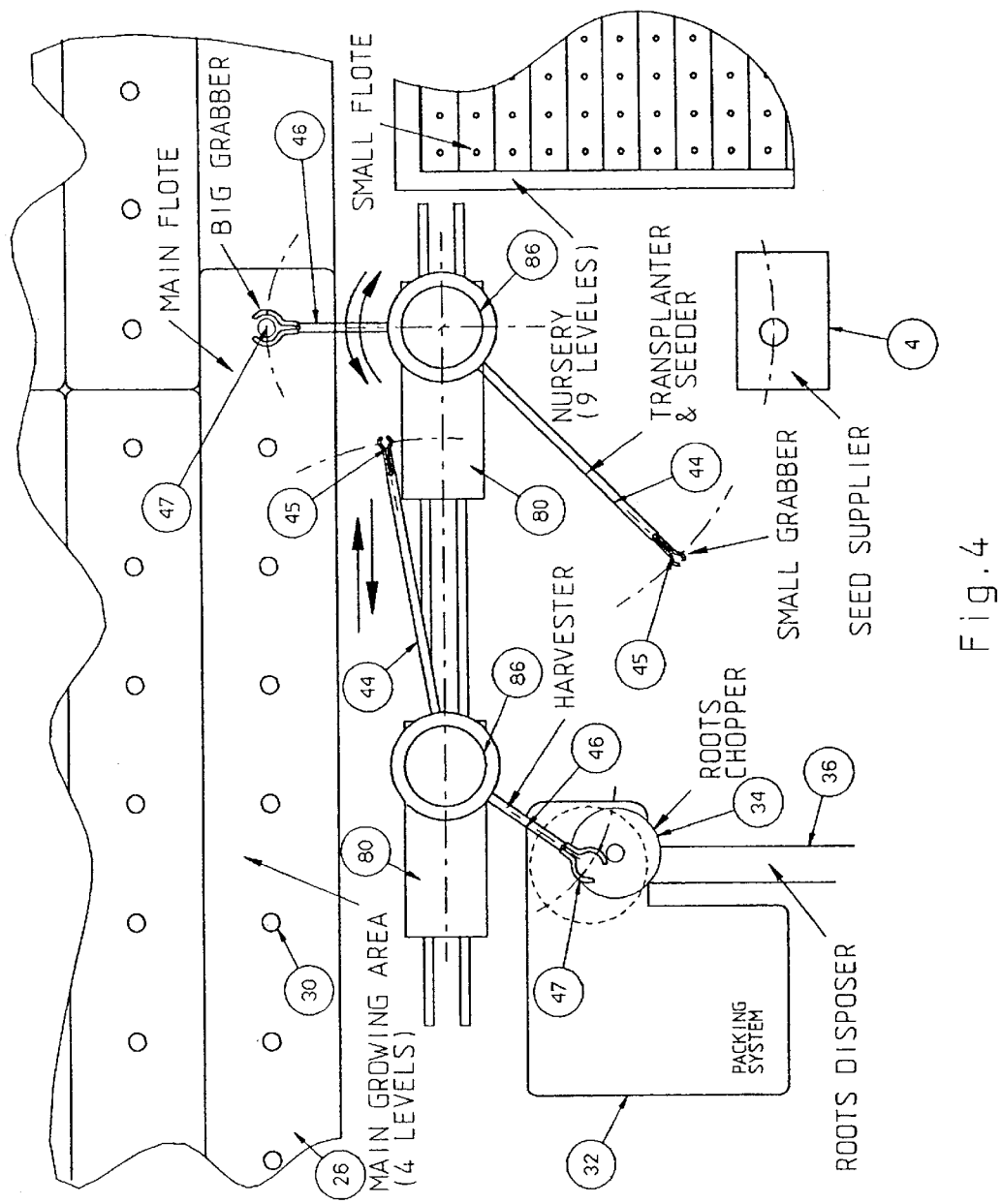
FIG. 4 is a top view of the automated system for providing a continuous yield of fresh agricultural produce according to the present invention illustrating the translational motion of the robotic device and its robotic arms.

Seeding, planting and harvesting robotic device 16 of system 2 according to the present invention will now be further described in context with FIG. 3. Thus, robotic device 16 includes a base 80 horizontally translatable along a horizontal guiding rail 82 attached to a floor of housing 6 in zone 40 which serves for holding automatic seeding, planting and harvesting equipment. Device 16 further includes a vertical shaft element 84 vertically extending from base 80, and an operative head 86 translatably engaged by vertical shaft 80 and which is equipped with at least one rotating robotic arm 44, 46 (two are shown), so as to allow a distal end of robotic arm(s) 44, 46 at least three degrees of freedom.

Seeding, planting and harvesting robotic device 16 further includes at least one motor 88 (three are shown) oppressively engaged therewith for performing at least one task, such as, but not limited to, horizontally translating base 80 along horizontal guiding rail 82, vertically translating operative head 86 along vertical shaft element 84, and, rotating at least one robotic arm 44, 46 relative to operative head 86.

Robotic arm(s) 44, 46 are equipped with a grabbing mechanism located at distal ends 45, 47 thereof The arm and grabbing mechanism are constructed and designed so as to perform at least one task, such as, but not limited to, picking up a seed, placing a seed, picking up a seedling, placing a seedling and picking up a mature plant.

As shown in FIG. 6, according to additional embodiments of the present invention, the seeding, planting and harvesting robotic device having at least one robotic arm is further equipped with a system for evaluating a quality parameter of a plant (e.g., seedling, mature plant, fruit).

The quality parameter to be evaluated can be, for example, plant height, leaf color, leaf area, plant mass, fruit color, fruit mass and/or plant metabolic capacity. The evaluation can be accomplished, for example, via a method, such as, but not limited to, contrast ultrasonic imaging, video imaging, spectro-radiometry imaging, effected via a suitable sensor 100 and/or tactile sensing effected by tactile sensitive surfaces 102 or arm 44 and/or 45. These methods have been employed in the past for evaluation of plant growth and therefore require no further description herein. It will be appreciated that adding this feature to the seeding, planting and harvesting robotic device of system 2 of the present invention allows monitoring of plant growth at all stages of the production cycle. This is advantageous for both culling of nonviable plants and for potential adjustment of production inputs if growth is too fast or too slow.

System 2 according to the present invention also includes at least one ancillary system selected from the group consisting of an irrigation system 22, a water conditioning system, which preferably includes a sterilization system 18 and a filtration system 20, a system for regulating oxygen/carbon dioxide balance, a system for regulating relative humidity, a lighting system, and a temperature control system. While some of these features are depicted within housing 6, it will be appreciated that they might equally well be located outside thereof, with the exception of the lighting system. Some or all of the ancillary systems may be grouped into a climate control system.

The irrigation system supplies water to both seeding and germination zone 8 and to planting and growth zone 24. Control of both delivery times and volumes to be delivered by irrigation system 22 is necessary and must be separately regulated for each zone/shelf of system 2.

The water conditioning system is depicted as a filtration system 18 and a sterilization system 20, but might also include provisions for de-ionization, de-chlorination, pH adjustment, addition of minerals, nutrients, fertilizers, hormones or growth promotants.

Regulation of oxygen/carbon dioxide balance can be effected by means of sensors controlling release of carbon dioxide from pressurized cylinders.

Relative humidity can be controlled via use of commercially available humidifiers/dehumidifiers. Due to the large surface area of irrigated seeding shelves and planting shelves within the housing, low humidity should not be a problem for most crops.

The lighting system is installed above each seeding shelf 62 and above each planting shelf 64. Agro-Lite bulbs (Philips Lighting, Somerset, N.J.) or similar commercially available lights are suitable for use as part of system 2 according to the present invention. Again, individual control of lighting for each shelf in the system is preferred as optimal lighting requirements vary throughout the growth cycle of a crop.

Temperature control is accomplished via the use of a commercial air-conditioning/heating system suited to climactic conditions where the housing for the system is installed.

Co-ordination of all ancillary systems, as well as of actions of the seeding, planting and harvesting robotic device, as further detailed hereinunder and of movement of suspendably translatable platforms in seeding shelves, and of suspendably translatable platforms in planting shelves is under the control of a computerized CPU 38. This arrangement allows collection of data on production parameters in the absence of personnel. Such data can be retrieved and reviewed on a periodic basis, or if the system performance requires adjustment.

Although the system is designed to operate automatically for an extended period of time, opening 40 is provided for periodic maintenance, repairs, and replenishment of supplies as needed by a worker.

As already stated hereinabove, according to a presently preferred embodiment of the present invention system 2 is housed in a standard container which serves as housing 6 of system 2. Opening 40 is realized in this case as the container's opening which has doors. According to this embodiment of the present invention, some or all of the equipment which occupies the zone for holding automatic seeding, planting and harvesting equipment is suspended on the inner side of the container's doors. Such an arrangement allows easy access for maintenance and repairs. Furthermore, such an arrangement allows east access to the seeding and planting zones, if so required.

Many of the devices and systems operatively engaged with system 2 according to the present invention are well known and are described herein in terms which allow one ordinarily skilled in the art to operably assemble such systems and devices into an operative system 2. In general, the unique and advantageous features of system 2 are its space exploitation ability and full automation in producing agricultural produce. Specific advantages of certain devices employed by system 2 are further described hereinabove, while the need for system 2 is described in detail in the Background section.

The present invention is further embodied by automated system 2 for providing a continuous yield of fresh agricultural produce. System 2 includes a housing 6 subdivided into a three dimensional seeding and germination zone 8, a three dimensional planting and growth zone 24 and a three dimensional zone for holding automatic seeding, planting and harvesting equipment 40. System 2 further includes at least one seeding shelf 62 in zone 8, shelf 62 including a two dimensional array of seeding locations 28 as detailed hereinabove. System 2 further includes at least one planting shelf 64 in zone 24, at least one shelf 64 including a two dimensional array of planting locations 30 as described hereinabove. System 2 further includes a robotic device 16 being at zone 40 for holding automatic seeding, planting and harvesting equipment, robotic device 16 including at least one robotic arm 44 for seeding seeds being stored in a seed reservoir 4 in the seeding locations 28, for planting seedlings in planting locations 30 and for harvesting mature plants from planting locations 30. At least one seeding shelf 62, and at least one planting shelf 64, may, according to some preferred embodiments, be arranged in a single, essentially vertical, stack. Housing 6 may be constructed, for example, of at least one 20 ft. shipping container or at least one 40 foot shipping container or any combination thereof.

The present invention is further embodied by automated system 2 for providing a continuous yield of fresh seedlings. System 2 includes a housing 6 subdivided into three dimensional seeding and germination zone 8 and three dimensional zone 40 for holding automatic seeding and seedlings transferring equipment. System 2 further includes at least one seeding shelf 62 in zone 8, shelf 62 including a two dimensional array of seeding locations 28 as detailed hereinabove. System 2 further includes a seeding and seedlings transferring robotic device 16 being at zone 40 for holding automatic seeding and seedlings transferring equipment. Robotic device 16 includes at least one robotic arm 44 for seeding seeds being stored in a seed reservoir 4 in the seeding locations 28 and for transferring germinated seedlings therefrom.

The present invention is further embodied by automated system 2 for providing a continuous yield of mature plants. System 2 includes a housing 6 subdivided into three dimensional planting and growth zone 24 and three dimensional zone for holding automatic seedling planting and plant harvesting equipment 40. System 2 further includes at least one planting shelf 64 in zone 24, shelf 64 including a two dimensional array of planting locations 30 as described hereinabove. System 2 further includes a seedling planting and plant harvesting robotic device 16 being at zone 40 for holding automatic seedling planting and plant harvesting equipment Robotic device 16 includes at least one robotic arm 44 for planting seedlings in planting locations 30 and for harvesting mature plants therefrom.

According to some preferred embodiments, housing 6 is divided into at least one additional zone for supporting development of at least one plant during a portion of a growth cycle. For example, housing 6 might be divided into 3, more preferably 4, most preferably 5 or more zones, each zone providing an optimum amount of space, light and nutrients for plants in a particular stage of the production or growth cycle. Alternately or additionally, housing 6 is divided into at least two climatic zones, each of the climatic zones being individually controlled by a climate control system. Climate zones might correspond, for example, to seeding and germination zone 8 and planting and growth zone 24.

System 2 is well suited to use in producing a wide variety of fresh agricultural produce, including but not limited to, vegetables, leafy vegetables, flowers, fruits, trees, tubers, fungi, cereal grains, genetically modified organisms or oilseeds. The flower may be, for example, Sunflower, (Helianthus), Indian mustard (Brassica) or Alyssum. The tree may be, for example, Acacia, Willow (Salix) and Poplar (Populus).

The genetically modified organism may be, for example, produced from a genetically modified seed introduced into housing 6. Alternately or additionally, the genetically modified organism may be produced within housing 6 by transforming a plant housed therein. According to some preferred embodiments, housing 6 serves as a biohazard containment facility.

According to some preferred embodiments of the invention a defined environment within housing 6 activates production of a secondary metabolite by a plant grown therein. The secondary metabolite is then harvestable either from at least a portion of the plant ore from a water supply of the plant.

Housing 6 may be airtight such that utilization of $CO_2$ deployed therein is more efficient than in previously known configurations.

According to preferred embodiments of the invention, the seeding and seedling transferring robotic device 16 includes a base 80 attached to housing 6 at the zone 40 for holding automatic seeding, planting and harvesting equipment, a vertical shaft element 84 vertically extending from base 80, and an operative head 86 translatably engaged by shaft 80 which is equipped with at least one robotic arm 44, so as to allow a distal end of the robotic arm at least one degree of freedom.

According to preferred embodiments of the invention, the seeds in seed reservoir 4 are, for example, monocotyledonous seeds, dicotyledonous seeds, at least a portion of a plant, spores, rooted plugs or tissue culture material. The at least a portion of a plant may be, for example, at least a portion of a leaf, at least a portion of a flower, at least a portion of a stem or at least a portion of a root.

According to preferred embodiments of the invention, the fresh seedling may be, for example, a seedling of a plant such as a vegetable, a leafy vegetable, a flower, a fruit, a tree, a tuber, a fungus, a cereal grain, a genetically modified organism or an oilseed.

According to preferred embodiments of the invention the mature plants may be, for example, vegetables, leafy vegetables, flowers, fruits, trees, tubers, or genetically modified organisms.

The present invention is further embodied by a system 2 for continuous culture of an aquatic plant. System 2 includes housing 6 containing a three dimensional aquaculture zone 24 and a three dimensional zone for aquaculture maintenance equipment 40. System 2 further includes at least one aquaculture shelf 300 (FIG. 7) in three dimensional aquaculture zone 24 and an aquaculture robotic device 16 in zone 40 for aquaculture maintenance equipment.

The present invention is further embodied by a method for continuous culture of an aquatic plant. The method includes the steps of providing housing 6 including a three dimensional aquaculture zone 24 and a three dimensional zone for aquaculture maintenance equipment 40. The method further includes the step of installing within housing 6 at least one aquaculture shelf 300 in aquaculture zone 24, and the step of using an aquaculture robotic device 16 to maintain the continuous culture of an aquatic plant.

The present invention is further embodied by a system 2 for reducing a concentration of a heavy metal ion in a water supply. System 2 includes housing 6 containing a three dimensional aquaculture zone 24 and a three dimensional zone for aquaculture maintenance equipment 40. System 2 further includes at least one aquaculture shelf 300 (FIG. 7) in three dimensional aquaculture zone 24 and an aquaculture robotic device 16 in zone 40 for aquaculture maintenance equipment. The aquatic plant grown in the at least one aquaculture shelf is capable of effecting bioremediation of the heavy metal ion in the water supply. Periodic removal of at least a portion of the biomass of the aquatic plant assures that addition bioremediation capacity is constantly available.

The present invention is further embodied by a method for reducing a concentration of a heavy metal ion in a water supply. The method includes the steps of providing housing 6 including a three dimensional aquaculture zone 24 and a three dimensional zone for aquaculture maintenance equipment 40. The method further includes the step of installing within housing 6 at least one aquaculture shelf 300 in aquaculture zone 24, and the step of using an aquaculture robotic device 16 to maintain the continuous culture of an aquatic plant. The method further includes the step of allowing an aquatic plant grown in the at least one aquaculture shelf to absorb at least a portion of the heavy metal ion in the water supply; and the step of removing at least a portion of a biomass of the aquatic plant containing the at least a portion of the heavy metal ion in the water supply, thereby effecting bioremediation.

According to yet another additional aspect of the present invention there is provided a system 2 for providing a continuous supply of a biomass of an aquatic plant. System 2 includes housing 6 containing a three dimensional aquaculture zone 24 and a three dimensional zone for aquaculture maintenance equipment 40. System 2 further includes at least one aquaculture shelf 300 (FIG. 7) in three dimensional aquaculture zone 24 and an aquaculture robotic device 16 in zone 40 for aquaculture maintenance equipment. Robotic device 16 periodically deposits at least a portion of a biomass of the aquatic plant in biomass harvest unit 302 for removal from housing 6.

The present invention is further embodied by a method for providing a continuous supply of a biomass of an aquatic plant. The method includes the steps of providing housing 6 including a three dimensional aquaculture zone 24 and a three dimensional zone for aquaculture maintenance equipment 40. The method further includes the step of installing within housing 6 at least one aquaculture shelf 300 in aquaculture zone 24, and the step of using an aquaculture robotic device 16 to maintain the continuous culture of an aquatic plant. The method further includes the step of periodically harvesting at least a portion of the biomass of the aquatic plant via biomass harvest unit 302 or by filtration of at least a portion of the water in aquaculture shelf 300.

The aquatic plant may be, for example, a submerged plant, a floating plant, a yeast, a fungus, an algae, a blue-green algae, or any other micro-organism. The floating plant may belong, for example, to a genus such as Salvinia, Azolla, Eichornia or Lemna. The submerged plant may belong, for example, to a genus such as Myriophillum, Nimphoides, Nymphaea or Ludwigia.

Robotic device 16 may be designed and constructed to periodically harvest at least a portion of a biomass of the aquatic plant. Robotic device 16 may therefore includes a base 80 attached to housing 6 at the zone 40 for aquaculture maintenance equipment, a vertical shaft element 84 vertically extending from base 80, and an operative head 86 translatably engaged by shaft 80 which is equipped with at least one robotic arm 44, so as to allow a distal end of the robotic arm at least one degree of freedom. At least one robotic arm 44 may be equipped with a tool 303 such as, for example, a comb, a net, a filter, a scoop or a strainer such that robotic arm 44 can be employed to effect a harvest of at least a portion of a biomass of the aquatic plant. Circular water flow 305 around divider 304 can bring at least a portion of the biomass of the aquatic plant within range of tool 303 on distal end 45 of robotic arm 44. Alternately or additionally, harvest of at least a portion of the biomass of the aquatic plant is effected by filtration of at least a portion of an aquaculture in the at least one aquaculture shelf 300.

System 2 may further include a device for performing at least one action including, bit not limited to, drying, crumbling, powderizing and grinding at least a portion of a biomass of the aquatic plant. Such actions might be performed, for example, in biomass harvest unit 302.

According to preferred embodiments of the invention, a genetically modified aquatic plant may be introduced into housing 6 and cultured therein. Alternately or additionally a genetically modified aquatic plant is produced within housing 6 by transforming an aquatic plant housed therein. Housing 6 may therefore serve as a biohazard containment facility.

According to preferred embodiments of the invention, a defined environment within housing 6 activates production of a secondary metabolite by the aquatic plant grown therein. The secondary metabolite is then harvestable either from at least a portion of the aquatic plant or from a water supply of the aquatic plant.

A device 200 (FIGS. 8 and 9) further embodies the present invention for nurturing seeds as they develop into seedlings, and for facilitating transfer of the seedlings. Device 200 includes a float 66 being formed with a plurality of seed accepting cavities 29 organized in pairs. Each of the pairs has a first member 206 and a second member 208. Cavities 29 are each open to an upper surface of float 66 and are in fluid communication with a bottom surface float 66, such that when the float floats over a water surface and cavities 29 receive seeds, each of the seeds is moistened. Device 200 further includes a cover 204 with a plurality of holes 205 corresponding to at least a portion of the cavities 29, whereas when the seeds develop roots, translational motion of cover 204 with respect to base 203 transfers each rooted seed from first member 206 of pair of cavities 29 to second member 208 of pair of cavities 29. According to preferred embodiments of the invention, fluid communication with the bottom surface of float 66 is through an item 202 such as, for example, a screen or a liquid permeable membrane.

The present invention further includes a device (FIGS. 10a–c) for nurturing a seed 407 as it develops into a seedling, and for facilitating transfer of the seedling. The device includes a cup holder 399 being formed with at least one cavity 397. Cavity 397 is capable of accepting a transferable cup 400. The device further includes transferable cup 400 seatable within each of the at least one cavity 397. The cavity is open to an upper surface of the cup holder. Cup 400 is capable of accepting and retaining seed 407 (FIG. 10a).

Preferably, the device further includes a quantity of gel 408 which serves to absorb moisture from a water supply 402 and transfer the moisture to seed 407. Gel 408 may reside, for example, in the at least one cavity 397 or in the transferable cup 400. Gel 408 preferably contains nutrients to foster development of the seedling. The nutrients are delivered to seed 407 as the moisture flows through gel 408 to seed 407. Gel 408 may be formulated primarily from, for example, agar, agarose, starch or other materials which are harmless to growing plants.

Cup 400 preferably contains at least one opening (403, 410, 411 or 409; FIG. 10c) large enough for a root originating from seed 407 to pass through. At least one opening (403, 410, 411 or 409) is preferably a slot (403, 410 or 411) capable of expanding to accommodate a growing root. The slot may be vertical 403, horizontal 410, or spiral 411 with respect to cup 400. Cup 400 is preferably conical (FIG. 10a and c), but may also be (FIG. 10b) tetrahedral 401, pyramidic 404, a portion of a cylinder and combinations thereof (405, 406). In order to prevent seed 407 from falling through hole 409 a commercially available disposable unit (e.g. KABUL brand of peat made by Ashwuin TC, Chennai, India) or a thin layer of gel, dried gel or a semi permeable membrane may be employed.

Cups 400 can be cast with the slots on the bottom, or vacuum formed. Slots 403, 410 or 411 may be cut after formation of cup 400, for example with a blade or heated wire according to known manufacturing methods. Preferably cup 400 is made of a plastic, for example PPE. According to alternate preferred embodiments, cup 400 is made from a biodegradable material, including, but not limited to, peat moss, cardboard, Kabul or dried gel.

Preferably the device further includes a robotic device 16 designed and constructed to engage transferable cup 400 and seat it in cavity 397 belonging to cup holder 399. The robotic device 16 preferably includes a gripper fashioned as part of robotic arm 44. The gripper is illustrated in FIGS. 11a–d. Preferably, the gripper is employed to effect a transfer of transferable cup 400 from a first cup holder 399 to a second cup holder 399 when an intermediate stage of maturity is reached. This may be, for example, to provide additional space for growth or to change environmental conditions, for example by transfer from zone 8 to zone 24.

The gripper may engage cup 400 in a variety of ways. For example a two arm gripper 412 may engage cup 400 from the sides (FIG. 11*a*). Alternately, a "tongs" gripper 413 may engage cup 400 from the inside and the outside of an edge (FIG. 11*b*). Preferably, engagement by tongs gripper 413 is by at least three points. For example, engagement of cup 400 may be accomplished by a rod 414 inside cup 400 (FIG. 11*c*; top view) and a plate 415 outside of cup 400. Alternately two rods 416 outside of cup 400 and one rod 417 inside cup 400 may be employed (FIG. 11*d*; top view). The gripper open and closed operative modes. A self compliant flexible joint is used to align the gripper to the correct location with respect to cup 400 and provide accuracy in engagement.

Thus, the present invent includes an automated method for growing a plant to a desired stage of maturity. The method includes providing a housing including at least one three dimensional plant growth zone (e.g. 8 or 24) and a three dimensional zone 40 for holding automatic robotic equipment. The method further includes installing within the housing a plurality of cup holders 399. Each of the cup holders is formed with at least one cavity 397 capable of accepting a transferable cup 400 and is open to an upper surface of cup holder 399. The method further includes providing a plurality of transferable cups 400 seatable within each of cavity 397. Cups 400 are capable of accepting and retaining a seed 407 or plant, therein. The method further includes installing within the housing a robotic device 16 being at the three dimensional zone for holding automatic robotic equipment 16 which includes at least one robotic arm 44 or 45 for placing a seed or plant into cup 400, for placing the cup 400 into cup holder 399 and for removing cup 400 from cup holder 399 when the desired stage of maturity is reached. The method further includes providing a regulatory mechanism 38 which co-ordinates the actions of robotic device 16 so that seeds or plants are placed in the cups 400, the cups are placed in the cup holders 399 and plants are harvested at a desired stage of maturity according to a pre-defined schedule.

Figure 12:
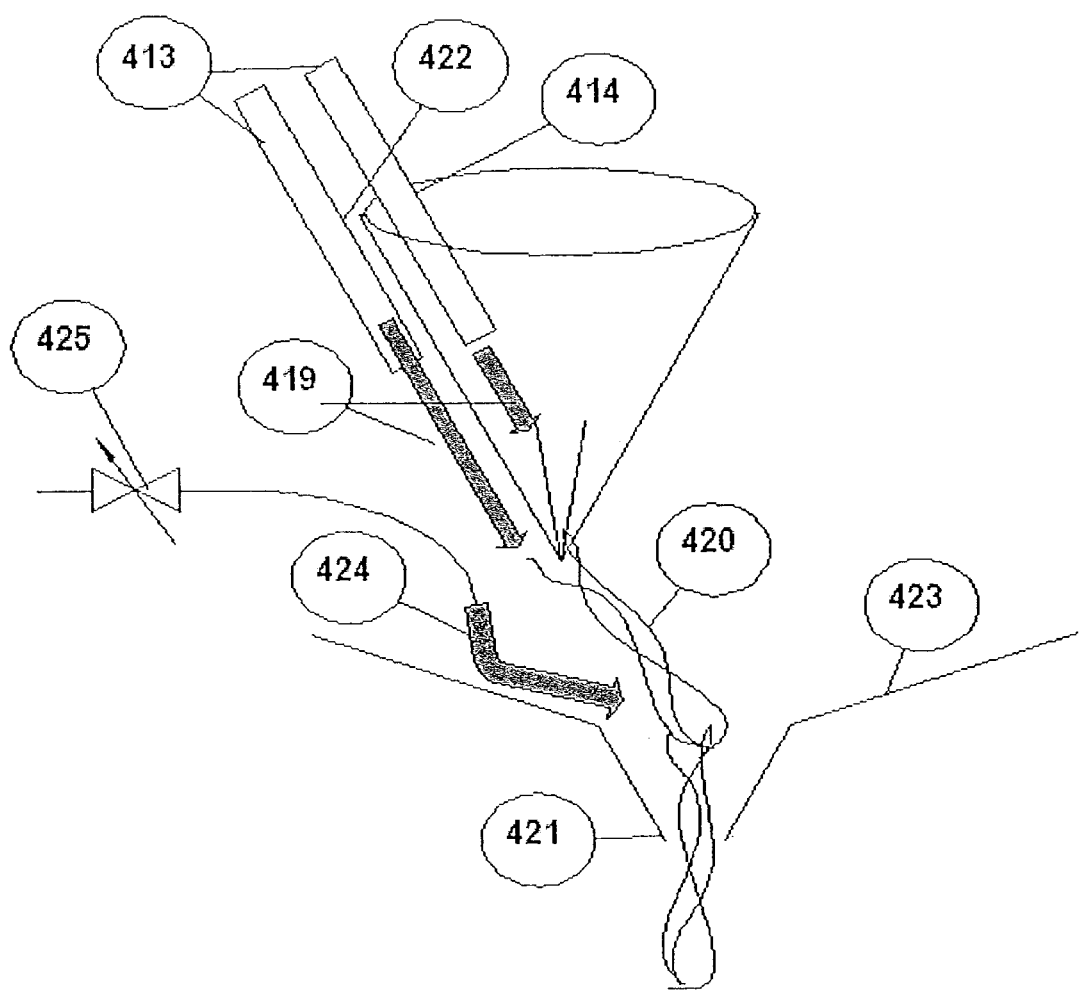
FIG. 12 illustrates a device for guiding exposed roots of a plant accurately to a target location.

According to still another aspect of the present invention there is provided a device (FIG. 12) for guiding exposed roots 420 of a plant accurately to a target location 421 during a transfer. The device includes a mechanism for directing a stream of water 419 or 424 downward along the exposed roots 420 so that roots 420 are grouped and straightened. This prevents roots 420 from contacting and/or adhering to walls of target location 421 or adjacent surface 423, which may be, for example, a cavity 397 belonging to cup holder 399. According to alternate preferred embodiments of the invention the water jet 419 emanates from a tube 414 inside a cup 400 holding the plant, or from a tube 422 outside of cup 400. Preferably, but not necessarily, tube 422 or 414 is constructed as part of, or attached to, gripper 412 or 413. Thus, the mechanism for directing a stream of water 419 operates in conjunction with a robotic device 412 or 413 (part of 16) engaged in transfer of the plant.

Alternately, water jet 424 is independent of gripper 413 (although it may still be physically connected to robotic device 16) and is applied directly to roots 420 below cup 400. This may be accomplished, for example, by directing water jet 424 along surface 423 adjacent to target location 421. Water jet 419 or 424 may be adjusted either manually, or preferably by regulatory mechanism 425. Regulatory mechanism 425 is preferably controlled by CPU 38, so that sufficient volume and flow of water is automatically applied to group and straighten roots 420 at time of transfer.

Thus, the invention is further embodied by a method for guiding exposed roots 420 of a plant accurately to a target location 421 during a transfer. The method includes directing a stream of water 419 or 424 downward along exposed roots 420 so in order to group and straighten them. This facilitates guiding the straightened roots to target location 421. Guiding is preferably accomplished by a robotic device 16 engaged in transfer of the plant, more specifically by a gripper 413 operating in conjunction with a robotic arm 44.

Figure 13:
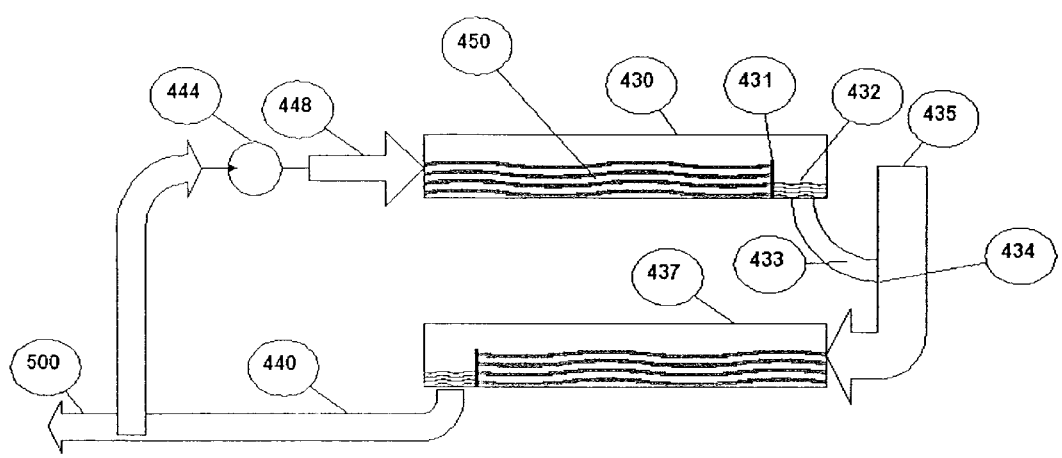
FIG. 13 illustrates a system for recycling and oxygenating irrigation water according to the present invention.

The present invention is further embodied by a system for recycling and oxygenating irrigation water (FIG. 13). The system for recycling and oxygenating irrigation water includes at least one first cultivation shelf 430 designed and constructed to contain at least a portion of the irrigation water 450. Each cultivation shelf (two are pictured, 430 and 437) includes a regulatory element 431 designed and constructed to allow a part of the at least a portion of the irrigation water 450 to flow downwards out of the cultivation shelf via overflow space 432 and exit pipe 433. The part of water 450 which has overflowed proceeds from exit pipe 433 via junction 434 to a mechanism for mixing air into the water 435 which is in fluid communication first cultivation 430 shelf and second cultivation shelf 437. Mechanism for mixing air into the water 435 is designed and constructed to overflow part of the at least a portion of the irrigation water 450 with air to produce aereated water and to transfer the aereated water to second cultivation shelf 437. Second cultivation shelf 437 is situated below first cultivation shelf 430 and is of similar construction. It will be appreciated that any number of cultivation shelves may be assembled into the system, although only two (430 and 437) are pictured. Preferably, the last shelf in the system (437 in the pictured 2-shelf system) spills overflow water 450 into a pump intake conduit 440 in fluid communication with pump 444, which pumps water 450 via return conduit 448 to first cultivation shelf 430. Alternately, overflow water 450 from the lowest shelf (437 in the pictured example), exits the system, for example via a drain 500.

According to one preferred embodiment of the invention the regulatory element 431 includes a gate having a height. Therefore, when a depth of the irrigation water in the first cultivation shelf exceeds the height, a part of the at least a portion of the irrigation water 450 flows downwards out of the first cultivation shelf for example via exit pipe 433.

Preferably mechanism for mixing 435 operates by introducing overflow portion of irrigation water 450 into a cavity containing the air. More preferably, mixing of water and air is increased by introduction of baffles into mechanism for mixing 435. These baffles may be horizontal protrusions, gravel, marbles, straw, fiberglass wool or any other material serving to disperse water 450 over an increased surface area.

Thus the invention is further embodied by a method of recycling and oxygenating irrigation water 450. The method includes providing at least one first cultivation shelf 430 as described hereinabove, allowing an overflow portion of irrigation water 450 to flow out of first cultivation shelf 430 and mixing overflow portion of irrigation water 450 with air and introducing aereated overflow portion of irrigation water 450 into second cultivation shelf 437 situated below first shelf 430.

Preferably, the method further includes allowing overflow portion of irrigation water 450 to flow out of the first shelf 430 water 450 reaches a predetermined depth within shelf 430. According to this method, mixing overflow portion of irrigation water 450 with air is accomplished by introducing the part of the at least a portion of the irrigation water into a cavity 435 containing the air. Preferably, the method further includes at least a portion of irrigation water 450 to a first cultivation shelf 430.

According preferred embodiments of any of the systems described hereinabove, a mechanism for directing a stream of water downward along an exposed root during planting is included so that a transfer of a seedling from a seeding shelf to a planting shelf, or from a planting shelf to a growing shelf is more easily accomplished by the robotic device.

According preferred embodiments of any of the systems described hereinabove, a water recycling and aereation system operating at a location selected from the group consisting of the at least one seeding shelf in the three dimensional seeding and germination zone, the at least one planting shelf in the three dimensional planting and growth zone and a combination thereof is further included.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An automated system for providing a continuous yield of fresh agricultural produce, the system comprising:
   (a) a housing including a three dimensional seeding and germination zone, a three dimensional planting and growth zone and a three dimensional zone for holding automatic seeding, planting and harvesting equipment;
   (b) at least one seeding shelf in said three dimensional seeding and germination zone, said seeding shelf including a two dimensional array of seeding locations, each of said locations being for accepting a seed and for supporting development of a seedling;
   (c) at least one planting shelf in said three dimensional planting and growth zone, said at least one planting shelf including a two dimensional array of planting locations, each of said locations being for accepting a seedling and for supporting development of the mature plant; and
   (d) a seeding, planting and harvesting robotic device being at said three dimensional zone for holding automatic seeding, planting and harvesting equipment, said robotic device including at least one robotic arm for seeding seeds being stored in a seed reservoir in said seeding locations, for planting seedlings in said planting locations and for harvesting mature plants from said planting locations.

2. The system of claim 1, further comprising at least one transferable cup designed and constructed to be seatable and retainable within said seeding locations and said planting locations and to be manipulatable by said robotic arm.

3. The system of claim 1, further comprising a mechanism for directing a stream of water downward along an exposed root during planting so that a transfer of a seedling from a seeding shelf to a planting shelf is more easily accomplished by said robotic device.

4. The system of claim 1, further comprising a water recycling and aereation system operating at a location selected from the group consisting of said at least one seeding shelf in said three dimensional seeding and germination zone, said at least one planting shelf in said three dimensional planting and growth zone and a combination thereof.

5. The system of claim 1, further comprising within said housing at least one additional zone for supporting development of at least one plant during a portion of a growth cycle.

6. The system of claim 1, wherein said housing is divided into at least two climatic zones, each of said climatic zones being individually controlled by a climate control system.

7. The system of claim 1, wherein said fresh agricultural produce is selected from the group consisting of a vegetable, a leafy vegetable, a flower, a fruit, a tree, a tuber, a fungus, a cereal grain, a genetically modified organism and an oilseed.

8. The system of claim 1, wherein a defined environment within said housing activates production of a secondary metabolite by a plant grown therein.

9. The system of claim 8 wherein said secondary metabolite is harvestable from at least one location selected from the group consisting of at least a portion of said plant and a water supply of said plant.

10. The system of claim 7, wherein said genetically modified organism is produced within said housing by transforming a plant housed therein.

11. The system of claim 1, wherein said housing serves as a biohazard containment facility.

12. The system of claim 1, wherein said housing is airtight such that utilization of $CO_2$ deployed therein is more efficient.

13. The system of claim 1, wherein said seeding and seedling transferring robotic device includes a base attached to said housing at said zone for holding automatic seeding, planting and harvesting equipment, a vertical shaft element vertically extending from said base, and an operative head translatably engaged by said shaft which is equipped with at least one robotic arm, so as to allow a distal end of said robotic arm at least one degree of freedom.

14. The system of claim 1, wherein said seeds in said seed reservoir are selected from the group consisting of monocotyledonous seeds, dicotyledonous seeds, at least a portion of a plant, spores, rooted plugs and tissue culture material.

15. The system of claim 14, wherein said at least a portion of a plant contains at least one item selected from the group consisting of at least a portion of a leaf, at least a portion of a flower, at least a portion of a stem and at least a portion of a root.

16. An automated system for providing a continuous yield of fresh seedlings, the system comprising:
   (a) a housing including a three dimensional seeding and germination zone and a three dimensional zone for holding automatic seeding and seedlings transferring equipment;
   (b) at least one seeding shelf in said three dimensional seeding and germination zone, said seeding shelf including a two dimensional array of seeding locations, each of said locations being for accepting a seed and for supporting development of a seedling; and
   (c) a seeding and seedlings transferring robotic device being at said three dimensional zone for holding automatic seeding and seedlings transferring equipment, said robotic device including at least one robotic arm for seeding seeds being stored in a seed reservoir in said seeding locations and for transferring germinated seedlings therefrom.

17. The system of claim 16, further comprising at least one transferable cup designed and constructed to be seatable and retainable within said seeding locations and to be manipulatable by said robotic arm.

18. The system of claim 16, further comprising a mechanism for directing a stream of water downward along an exposed root during said transferring germinated seedlings so that guiding said germinated seedling to a target location is more easily accomplished by said robotic device.

19. The system of claim 16, further comprising a water recycling and aeration system operating at said at least one seeding shelf in said three dimensional seeding and germination zone.

20. The system of claim 16, further comprising within said housing at least one additional zone for supporting development of at least one plant during a portion of a growth cycle.

21. The system of claim 16, wherein said housing is divided into at least two climatic zones, each of said climatic zones being individually controlled by a climate control system.

22. The system of claim 16, wherein said fresh seedling is a seedling of a plant selected from the group consisting of a vegetable, a leafy vegetable, a flower, a fruit, a tree, a tuber, a fungus, a cereal grain, a genetically modified organism and an oilseed.

23. The system of claim 16, wherein a defined environment within said housing activates production of a secondary metabolite by a seedling grown therein.

24. The system of claim 23, wherein said secondary metabolite is harvestable from at least one location selected from the group consisting of at least a portion of said plant and a water supply of said plant.

25. The system of claim 22, wherein said genetically modified organism is produced within said housing by transforming a plant housed therein.

26. The system of claim 16, wherein said housing serves as a biohazard containment facility.

27. The system of claim 16, wherein said housing is airtight such that utilization of $CO_2$ deployed therein is more efficient.

28. The system of claim 16, wherein said seeding and seedling transferring robotic device includes a base attached to said housing at said zone for holding automatic seeding, planting and harvesting equipment, a vertical shaft element vertically extending from said base, and an operative head translatably engaged by said shaft which is equipped with at least one robotic arm, so as to allow a distal end of said robotic arm at least one degree of freedom.

29. The system of claim 16, wherein said seeds in said seed reservoir are selected from the group consisting of monocotyledonous seeds, dicotyledonous seeds, at least a portion of a plant, spores, rooted plugs and tissue culture material.

30. The system of claim 29, wherein said at least a portion of a plant contains at least one item selected from the group consisting of at least a portion of a leaf, at least a portion of a flower, at least a portion of a stem and at least a portion of a root.

31. An automated system for providing a continuous yield of mature plants, the system comprising:
(a) a housing including a three dimensional planting and growth zone and a three dimensional zone for holding automatic seedling planting and plant harvesting equipment;
(b) at least one planting shelf in said three dimensional planting and growth zone, said at least one planting shelf including a two dimensional array of planting locations, each of said locations being for accepting a seedling and for supporting development of the mature plant; and
(c) a seedling planting and plant harvesting robotic device being at said three dimensional zone for holding automatic seedling planting and plant harvesting equipment, said robotic device including at least one robotic arm for planting seedlings in said planting locations and for harvesting mature plants grown in said planting locations.

32. The system of claim 31, further comprising at least one transferable cup designed and constructed to be seatable and retainable within said planting locations and to be manipulatable by said robotic arm.

33. The system of claim 31, further comprising a mechanism for directing a stream of water downward along an exposed root of a seedling so that a transfer of a seedling to a planting shelf is more easily accomplished by said robotic device.

34. The system of claim 31, further comprising a water recycling and aeration system operating at said at least one planting shelf in said three dimensional planting and growth zone.

35. The system of claim 31, further comprising within said housing at least one additional zone for supporting development of at least one plant during a portion of a growth cycle.

36. The system of claim 31, wherein said housing is divided into at least two climatic zones, each of said climatic zones being individually controlled by a climate control system.

37. The system of claim 31, wherein said mature plants are selected from the group consisting of a vegetable, a leafy vegetable, a flower, a fruit, a tree, tuber, and a genetically modified organism.

38. The system of claim 31, wherein a defined environment within said housing activates production of a secondary metabolite by a plant grown therein.

39. The system of claim 38 wherein said secondary metabolite is harvestable from at least one location selected from the group consisting of at least a portion of said plant and a water supply of said plant.

40. The system of claim 37, wherein said genetically modified organism is produced within said housing by transforming a plant housed therein.

41. The system of claim 31, wherein said housing serves as a biohazard containment facility.

42. The system of claim 31, wherein said housing is constructed of at least one item selected from the group consisting of at least one 20 ft. shipping container and at least one 40 foot shipping container.

43. The system of claim 31, wherein said housing is airtight such that utilization of $CO_2$ deployed therein is more efficient.

44. The system of claim 31, wherein said seedling planting and plant harvesting robotic device includes a base attached to said housing at said zone for holding automatic seeding, planting and harvesting equipment, a vertical shaft element vertically extending from said base, and an operative head translatably engaged by said shaft which is equipped with at least one robotic arm, so as to allow a distal end of said robotic arm at least one degree of freedom.

45. A system for continuous culture of an aquatic plant, the system comprising:
(a) a housing including a three dimensional aquaculture zone and a three dimensional zone for aquaculture maintenance equipment;
(b) at least one aquaculture shelf in said three dimensional aquaculture zone; and
(c) an aquaculture robotic device being at said three dimensional zone for aquaculture maintenance equipment.

46. The system of claim 45, wherein the aquatic plant is selected from the group consisting of a submerged plant, a floating plant, a yeast, a fungus, an algae, a blue-green algae, and other micro-organisms.

47. The system of claim 45, wherein said robotic device is designed and constructed to periodically harvest at least a portion of a biomass of the aquatic plant.

48. The system of claim 45, further comprising:
   (d) a device for performing at least one action selected from the group consisting of drying, crumbling, powderizing and grinding at least a portion of a biomass of the aquatic plant.

49. The system of claim 45 wherein harvest of at least a portion of a biomass of the aquatic plant is effected by filtration of at least a portion of an aquaculture in said at least one aquaculture shelf.

50. The system of claim 45, further comprising within said housing at least one additional zone for supporting development of at least one aquatic plant during a portion of a growth cycle.

51. The system of claim 45, wherein said housing is divided into at least two climatic zones, each of said climatic zones being individually controlled by a climate control system.

52. The system of claim 45, wherein a genetically modified aquatic plant is introduced into said housing and cultured therein.

53. The system of claim 45, wherein a defined environment within said housing activates production of a secondary metabolite by the aquatic grown therein.

54. The system of claim 53 wherein said secondary metabolite is harvestable from at least one location selected from the group consisting of at least a portion of said aquatic plant and a water supply of said aquatic plant.

55. The system of claim 45, wherein a genetically modified aquatic plant is produced within said housing by transforming an aquatic plant housed therein.

56. The system of claim 45, wherein said housing serves as a biohazard containment facility.

57. The system of claim 45, wherein said housing is constructed of at least one item selected from the group consisting of at least one 20 ft. shipping container and at least one 40 foot shipping container.

58. The system of claim 45, wherein said housing is airtight such that utilization of $CO_2$ deployed therein is more efficient.

59. The system of claim 45, wherein said robotic device includes a base attached to said housing at said zone for aquaculture maintenance equipment, a vertical shaft element vertically extending from said base, and an operative head translatably engaged by said shaft which is equipped with at least one robotic arm, so as to allow a distal end of said robotic arm at least one degree of freedom.

60. The system of claim 59, wherein said at least one robotic arm is equipped with a tool selected from the group consisting of a comb, a net, a filter, a scoop and a strainer such that said robotic arm can be employed to effect a harvest of at least a portion of a biomass of the aquatic plant.

61. A system for reducing a concentration of a heavy metal ion in a water supply, the system comprising:
   (a) a housing including a three dimensional aquaculture zone and a three dimensional zone for aquaculture maintenance equipment;
   (b) at least one aquaculture shelf in said three dimensional aquaculture zone; and
   (c) an aquaculture robotic device being at said three dimensional zone for aquaculture maintenance equipment;

wherein an aquatic plant grown in said at least one aquaculture shelf is capable of effecting bioremediation of the heavy metal ion in the water supply.

62. The system of claim 61, wherein the aquatic plant is selected from the group consisting of a submerged plant, a floating plant, a yeast, a fungus, an algae, a blue-green algae, and other micro-organisms.

63. The system of claim 61, wherein said robotic device is designed and constructed to periodically harvest at least a portion of a biomass of the aquatic plant.

64. The system of claim 61, further comprising:
   (d) a device for performing at least one action selected from the group consisting of drying, crumbling, powderizing and grinding at least a portion of a biomass of the aquatic plant.

65. The system of claim 61 wherein harvest of at least a portion of a biomass of the aquatic plant is effected by filtration of at least a portion of an aquaculture in said at least one aquaculture shelf.

66. The system of claim 61, further comprising within said housing at least one additional zone for supporting development of at least one aquatic plant during a portion of a growth cycle.

67. The system of claim 61, wherein said housing is divided into at least two climatic zones, each of said climatic zones being individually controlled by a climate control system.

68. The system of claim 61, wherein a genetically modified aquatic plant is introduced into said housing and cultured therein.

69. The system of claim 61, wherein a defined environment within said housing activates production of a secondary metabolite by the aquatic grown therein.

70. The system of claim 69, wherein said secondary metabolite is harvestable from at least one location selected from the group consisting of at least a portion of said aquatic plant and a water supply of said aquatic plant.

71. The system of claim 61, wherein a genetically modified aquatic plant is produced within said housing by transforming an aquatic plant housed therein.

72. The system of claim 61, wherein said housing serves as a biohazard containment facility.

73. The system of claim 61, wherein said housing is constructed of at least one item selected from the group consisting of at least one 20 ft. shipping container and at least one 40 foot shipping container.

74. The system of claim 61, wherein said housing is airtight such that utilization of $CO_2$ deployed therein is more efficient.

75. The system of claim 61, wherein said robotic device includes a base attached to said housing at said zone for aquaculture maintenance equipment, a vertical shaft element vertically extending from said base, and an operative head translatably engaged by said shaft which is equipped with at least one robotic arm, so as to allow a distal end of said robotic arm at least one degree of freedom.

76. The system of claim 61, wherein said at least one robotic arm is equipped with a tool selected from the group consisting of a comb, a net, a filter, a scoop and a strainer such that said robotic arm can be employed to effect a harvest of at least a portion of a biomass of the aquatic plant.

77. A system for providing a continuous supply of a biomass of an aquatic plant, the system comprising:
   (a) a housing including a three dimensional aquaculture zone and a three dimensional zone for aquaculture maintenance equipment;
   (b) at least one aquaculture shelf in said three dimensional aquaculture zone; and (c) an aquaculture robotic device being at said three dimensional zone for aquaculture maintenance equipment.

78. The system of claim 77, wherein the aquatic plant is selected from the group consisting of a submerged plant, a floating plant, a yeast, a fungus, an algae, a blue-green algae, and other micro-organisms.

79. The system of claim 77, wherein said robotic device is designed and constructed to periodically harvest at least a portion of a biomass of the aquatic plant.

80. The system of claim 77, further comprising:
(d) a device for performing at least one action selected from the group consisting of drying, crumbling, powderizing and grinding at least a portion of a biomass of the aquatic plant.

81. The system of claim 77 wherein harvest of at least a portion of a biomass of the aquatic plant is effected by filtration of at least a portion of an aquaculture in said at least one aquaculture shelf.

82. The system of claim 77, further comprising within said housing at least one additional zone for supporting development of at least one aquatic plant during a portion of a growth cycle.

83. The system of claim 77, wherein said housing is divided into at least two climatic zones, each of said climatic zones being individually controlled by a climate control system.

84. The system of claim 77, wherein a genetically modified aquatic plant is introduced into said housing and cultured therein.

85. The system of claim 77, wherein a defined environment within said housing activates production of a secondary metabolite by the aquatic grown therein.

86. The system of claim 85 wherein said secondary metabolite is harvestable from at least one location selected from the group consisting of at least a portion of said aquatic plant and a water supply of said aquatic plant.

87. The system of claim 77, wherein a genetically modified aquatic plant is produced within said housing by transforming an aquatic plant housed therein.

88. The system of claim 77, wherein said housing serves as a biohazard containment facility.

89. The system of claim 77, wherein said housing is constructed of at least one item selected from the group consisting of at least one 20 ft. shipping container and at least one 40 foot shipping container.

90. The system of claim 77, wherein said housing is airtight such that utilization of $CO_2$ deployed therein is more efficient.

91. The system of claim 77, wherein said robotic device includes a base attached to said housing at said zone for aquaculture maintenance equipment, a vertical shaft element vertically extending from said base, and an operative head translatably engaged by said shaft which is equipped with at least one robotic arm, so as to allow a distal end of said robotic arm at least one degree of freedom.

92. The system of claim 91, wherein said at least one robotic arm is equipped with a tool selected from the group consisting of a comb, a net, a filter, a scoop and a strainer such that said robotic arm can be employed to effect a harvest of at least a portion of a biomass of the aquatic plant.

93. A device for nurturing seeds as they develop into seedlings, and for facilitating transfer of said seedlings, the device comprising:
(a) a float being formed with a plurality of seed accepting cavities organized in pairs, each of said pairs having a first member and a second member;
(b) said cavities, each being open to an upper surface of said float and being in fluid communication with a bottom surface of said float, such that when said float floats over a water surface and said cavities receive seeds, said each of said seeds is moistened; and
(c) a cover with a plurality of holes corresponding to at least a portion of said cavities, whereas when said seeds develop roots, translational motion of said cover transfers each rooted seed from said first member of said pair of cavities to said second member of said pair of cavities.

94. The device of claim 93, wherein said fluid communication with said bottom surface of said float is through an item selected from the group consisting of a screen and a liquid permeable membrane.

95. A device for nurturing a seed as it develops into a seedling, and for facilitating transfer of the seedling, the device comprising:
(a) a cup holder being formed with at least one cavity capable of accepting a transferable cup, said cavity being open to an upper surface of said cup holder; and
(b) said transferable cup seatable within each of said at least one cavity, said cup capable of accepting and retaining a seed, therein.

96. The device of claim 95, further comprising:
(c) a quantity of gel, said gel serving to absorb moisture from a water supply and transfer said moisture to the seed.

97. The device of claim 95, wherein said quantity of gel resides in a location selected from the group consisting of said at least one cavity and said transferable cup.

98. The device of claim 95, wherein said cup contains at least one opening large enough for a root originating from the seed to pass through.

99. The device of claim 96, wherein said gel contains nutrients to foster development of the seedling, said nutrients being delivered to the seed as said moisture flows through said gel to the seed.

100. The device of claim 95, wherein said transferable cup has a shape selected from the group consisting of conical, tetrahedral, pyramidic, cylindrical and portions thereof and combinations thereof.

101. The device of claim 95, wherein said transferable cup further comprises at least one exit means for a root developing from said seed retained therein.

102. The device of claim 95, further comprising a robotic device designed and constructed to engage a transferable cup and seat said transferable cup in a cavity belonging to said at least one cavity of said cup holder.

103. A device for guiding exposed roots of a plant accurately to a target location during a transfer, the device comprising a mechanism for directing a stream of water downward along the exposed roots so that the roots are straightened.

104. The device of claim 103, wherein said mechanism for directing a stream of water operates in conjunction with a robotic device engaged in transfer of the plant.

105. The device of claim 103, wherein said mechanism for directing a stream of water and said robotic device are physically connected one to the other.

106. A system for recycling and oxygenating irrigation water, the system comprising:
(a) at least one first cultivation shelf designed and constructed to contain at least a portion of the irrigation water and including a regulatory element;

(b) said regulatory element designed and constructed to allow a part of said at least a portion of the irrigation water to flow downwards out of said first cultivation shelf into a mechanism for mixing;

(c) said mechanism for mixing being in fluid communication with said first cultivation shelf and a second cultivation shelf, and being designed and constructed to receive said part of said at least a portion of the irrigation water with air to produce aereated water and to transfer said aereated water to a said second cultivation shelf; and (d) said second cultivation shelf situated below said first cultivation shelf, said second shelf designed and constructed to contain at least a portion of the irrigation water.

107. The system of claim 106, wherein said regulatory element comprises a gate having a height, so that when a depth of the irrigation water in said first cultivation shelf exceeds said height, a part of said at least a portion of the irrigation water flows downwards out of said first cultivation shelf.

108. The system of claim 106, wherein said mechanism for mixing operates by introducing said part of said at least a portion of the irrigation water into a cavity containing said air.

109. The system of claim 106, further comprising a pump designed and constructed to return said part of said at least a portion of the irrigation water to said first cultivation shelf.

* * * * *

UNITED STATES PATENT AND TRADEMARK OFFICE
CERTIFICATE OF CORRECTION

PATENT NO. : 6,508,033 B2
DATED : January 21, 2003
INVENTOR(S) : Hessel et al.

It is certified that error appears in the above-identified patent and that said Letters Patent is hereby corrected as shown below:

<u>Title page,</u>
Item [63], Related U.S. Application Data, should read:

-- Continuation in part of U.S. Patent Application no. 09/387793 filed on September 1, 1999 now issued as US Patent 6,243,987. --

Signed and Sealed this

Eighth Day of July, 2003

JAMES E. ROGAN
*Director of the United States Patent and Trademark Office*